(12) United States Patent
Reading et al.

(10) Patent No.: US 11,712,804 B2
(45) Date of Patent: Aug. 1, 2023

(54) SYSTEMS AND METHODS FOR ADAPTIVE ROBOTIC MOTION CONTROL

(71) Applicant: Samsung Electronics Company, Ltd., Gyeonggi-do (KR)

(72) Inventors: Dean N. Reading, Sunnyvale, CA (US); Sergio Perdices-Gonzalez, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 17/215,990

(22) Filed: Mar. 29, 2021

(65) Prior Publication Data

US 2022/0305652 A1    Sep. 29, 2022

(51) Int. Cl.
*B25J 9/16* (2006.01)
*B25J 13/08* (2006.01)

(52) U.S. Cl.
CPC ............. *B25J 9/1664* (2013.01); *B25J 9/163* (2013.01); *B25J 9/1674* (2013.01); *B25J 13/088* (2013.01)

(58) Field of Classification Search
CPC ........ B25J 9/1664; B25J 9/163; B25J 9/1674; B25J 13/088; B25J 9/1692; B25J 19/06; B25J 9/1653; B25J 9/1651; Y02P 90/02; G05B 2219/39017; G05B 2219/39043; G05B 2219/39024; G05B 2219/39029; G05B 2219/41092; G05B 2219/41095; G05B 2219/37622; G05B 2219/41125; G05B 2219/41183; G05B 2219/41184; G05B 2219/41186; G05B 2219/41203;

(Continued)

(56) References Cited

U.S. PATENT DOCUMENTS 5,994,844 A    11/1999    Crawford
6,442,451 B1    8/2002    Lapham
(Continued)

FOREIGN PATENT DOCUMENTS

CN    109921680    6/2019
EP    1705541    7/2010
(Continued)

OTHER PUBLICATIONS

Yaskawa Smart Series Brochure, pp. 1-4, Mar. 2021.
(Continued)

*Primary Examiner* — Abby Y Lin
*Assistant Examiner* — Esvinder Singh

(57) ABSTRACT

In one embodiment, a method includes by a robotic system: accessing a trajectory plan to be executed by the robotic system, where the trajectory plan includes desired poses at specified times, respectively, for each actuator of the robotic system, executing the trajectory plan for each actuator of the robotic system; monitoring, in real-time for each actuator during execution of the trajectory plan, an actual pose of the respective actuator, determining, based on the monitoring of the actuators, that one or more of the actuators is lagging, where the actual pose of each lagging actuator deviates from the desired pose by more than an error threshold, and adjusting, in real-time responsive to determining that one or more of the actuators is lagging, one or more of the desired poses at one or more specified times, respectively, of the trajectory plan.

20 Claims, 12 Drawing Sheets

(58) Field of Classification Search
CPC ........... G05B 2219/42297; G05B 2219/43131; G05B 2219/43133; G05B 2219/49189
See application file for complete search history.

(56) References Cited

U.S. PATENT DOCUMENTS

| | | | |
|---|---|---|---|
| 8,676,381 | B2 | 3/2014 | Kwon |
| 9,533,411 | B2 | 1/2017 | Jacobsen |
| 10,246,152 | B2 | 4/2019 | Takagi |
| 10,661,398 | B2 | 5/2020 | Isobe |
| 10,765,537 | B2 | 9/2020 | Smith |
| 2007/0086755 | A1 | 4/2007 | Dang |
| 2010/0262289 | A1 | 10/2010 | Hsu |
| 2011/0022234 | A1 | 1/2011 | Meyer |
| 2013/0253419 | A1 | 9/2013 | Favreau |
| 2014/0107841 | A1 | 4/2014 | Danko |
| 2016/0016309 | A1 | 1/2016 | Swift |
| 2017/0015004 | A1* | 1/2017 | Osaka .................. B25J 9/1641 |
| 2017/0258549 | A1 | 9/2017 | Tamura |
| 2018/0318023 | A1 | 11/2018 | Griffiths |
| 2019/0070762 | A1 | 3/2019 | Altonen |
| 2019/0113904 | A1 | 4/2019 | Iijima |
| 2019/0203822 | A1 | 7/2019 | Antonello |
| 2020/0001450 | A1 | 1/2020 | Smith |
| 2020/0070346 | A1 | 3/2020 | Oaki |
| 2020/0078947 | A1* | 3/2020 | Wang .................. B25J 9/1692 |
| 2020/0086488 | A1* | 3/2020 | Sato .................... B25J 9/1653 |
| 2020/0215692 | A1 | 7/2020 | Pivac |
| 2020/0230818 | A1 | 7/2020 | Lee |
| 2020/0262082 | A1 | 8/2020 | Schoessler |
| 2021/0036690 | A1 | 2/2021 | Tang |
| 2021/0114217 | A1 | 4/2021 | Kikuchi |
| 2021/0316451 | A1 | 10/2021 | Kumar |
| 2022/0061934 | A1 | 3/2022 | Sen |
| 2022/0088780 | A1* | 3/2022 | Abdul-hadi ........... B25J 9/1664 |
| 2022/0126440 | A1 | 4/2022 | Mizobe |
| 2022/0175472 | A1* | 6/2022 | Brisson ................ B25J 9/163 |
| 2022/0305646 | A1 | 9/2022 | Jain |

FOREIGN PATENT DOCUMENTS

| | | |
|---|---|---|
| JP | H11-063119 A | 3/1999 |
| JP | 3633760 | 3/2005 |
| JP | 2005284828 A | 10/2005 |
| JP | 2007-141189 A | 6/2007 |
| JP | 5758777 | 6/2015 |
| JP | 2016-035677 A | 3/2016 |
| KR | 20150109286 | 10/2015 |
| KR | 10-1640931 B1 | 7/2016 |
| KR | 10-2016-0139973 A | 12/2016 |
| KR | 102025100 | 9/2019 |
| KR | 10-2020-0064405 A | 6/2020 |
| KR | 1020200081407 | 7/2020 |
| WO | WO 2020-049152 | 3/2020 |

OTHER PUBLICATIONS

Gealy, David V., Stephen McKinley, Brent Yi, Philipp Wu, Phillip R. Downey, Greg Balke, Allan Zhao et al. "Quasi-direct drive for low-cost compliant robotic manipulation." In 2019 International Conference on Robotics and Automation (ICRA), pp. 437-443. IEEE, 2019, Apr. 19, 2011.

AVID CNC Pro4848 CNC Assembly Instructions, Section 4: Rack and Pinion Drive pp. 189-242, May 2020.

PCT Search Report in PCT/KR2022/004212, dated Jul. 4, 2022.
PCT Written Opinion in PCT/KR2022/004212, dated Jul. 4, 2022.
PCT Search Report in PCT/KR2022/005027, dated Jul. 26, 2022.
PCT Written Opinion in PCT/KR2022/005027, dated Jul. 26, 2022.
PCT Search Report in PCT/KR2022/003514, dated Jun. 16, 2022.
PCT Written Opinion in PCT/KR2022/003514, dated Jun. 16, 2022.
Non-final Office Action in U.S. Appl. No. 17/229,72, filed Dec. 15, 2022.
Non-final Office Action in U.S. Appl. No. 17/216,338, dated Dec. 19, 2022.
Notice of Allowance in U.S. Appl. No. 17/216,338, dated Mar. 29, 2023.
Notice of Allowance in U.S. Appl. No. 17/229,724, dated Apr. 5, 2023.

* cited by examiner

SYSTEMS AND METHODS FOR ADAPTIVE ROBOTIC MOTION CONTROL

TECHNICAL FIELD

This disclosure relates generally to robotics, and in particular relates to robotic motion control.

BACKGROUND

A robot is a machine, especially one programmable by a computer, capable of carrying out a complex series of actions automatically. Robots may be guided by an external control device or the control may be embedded within. Robots may be constructed on the lines of human form, but most robots are machines designed to perform a task with no regard to their aesthetics. Robots may be autonomous or semi-autonomous and range from humanoids to industrial robots, medical operating robots, patient assist robots, dog therapy robots, collectively programmed swarm robots, UAV drones, and even microscopic nano robots. By mimicking a lifelike appearance or automating movements, a robot may convey a sense of intelligence or thought of its own.

The branch of technology that deals with the design, construction, operation, and application of robots, as well as computer systems for their control, sensory feedback, and information processing is robotics. These technologies deal with automated machines that can take the place of humans in dangerous environments or manufacturing processes, or resemble humans in appearance, behavior, or cognition.

Motion control is a sub-field of automation, which may encompass the systems or sub-systems involved in moving parts of robots and other machines in a controlled manner. Motion control systems are used in a variety of fields for automation purposes.

DESCRIPTION OF EXAMPLE EMBODIMENTS

Robotic System Overview

Figure 1:
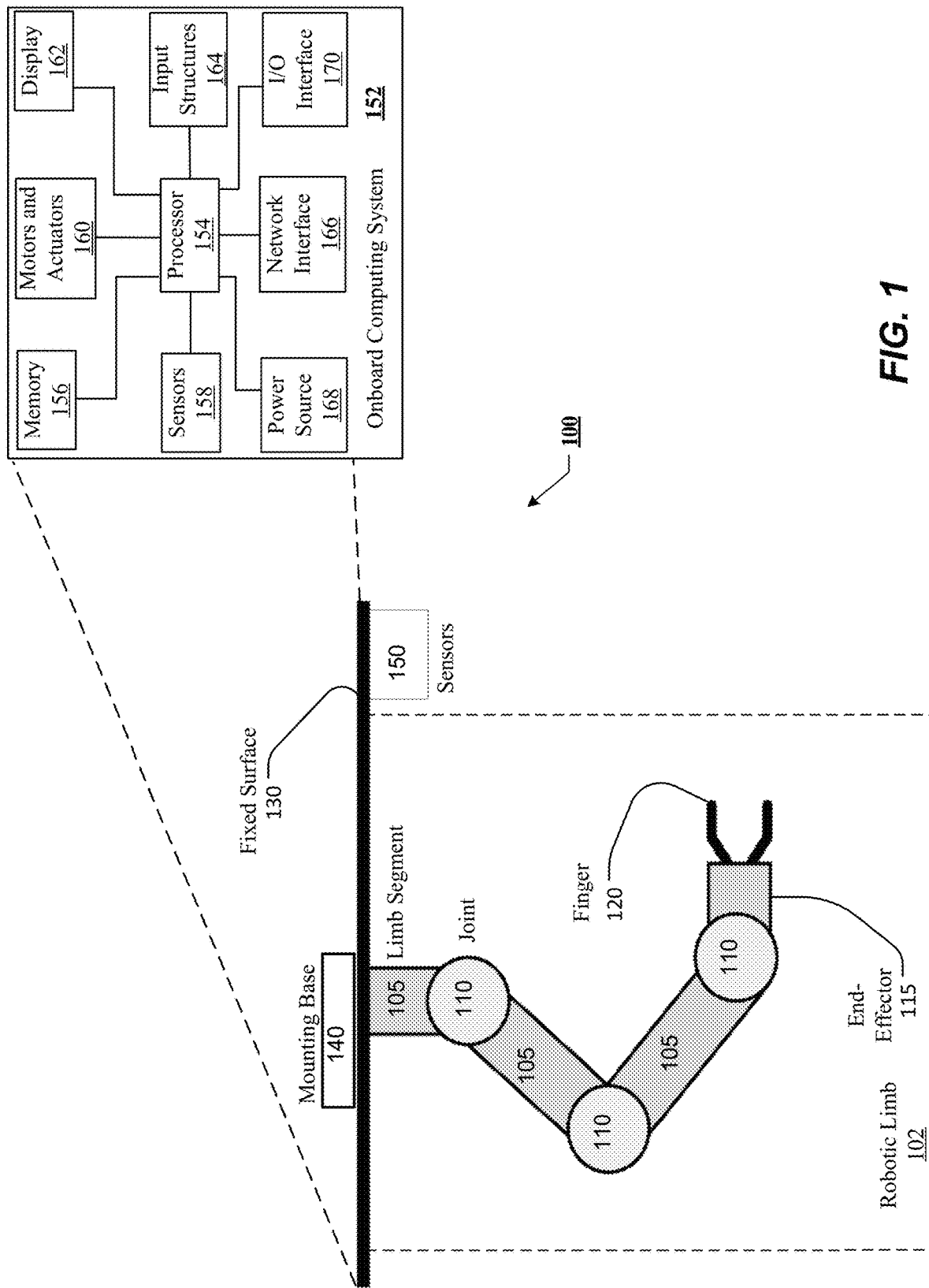
FIG. 1 illustrates an example robotic limb and apparatus.

This disclosure describes systems and methods that combine lightweight and low-cost components with captured sensor data from one or more sensors, such as image sensors, to increase the accuracy and precision of the robotic system through software. Image sensors are often affordable relative to robotic limb components and can be accurate for measuring distances and poses of objects within their respective fields of view.

In particular embodiments, a robotic system 100 may include a robotic limb that may perform operations to provide services to one or more users in different tasks such as cooking, gardening, painting, etc. Robotic limb 102 may include any suitable combination of one or more limb segment 105, joint 110, and end-effector 115. In some embodiments, robotic limb 102 may further include one or more manipulators. As an example and not by way of limitation, this manipulator may include one or more fingers 120, a suction-based gripper, or a jammable-based gripper. In some embodiments, robotic limb 102 may be connected at one end to a fixed surface 130 via mounting base 140, which may be a low-profile mounting base. As an example and not by way of limitation, this fixed surface may include a wall, a ceiling, a cabinet, a workbench, etc. In some embodiments, robotic limb 102 may be associated with one or more external sensors 150. As an example and not by way of limitation, an external RGB camera may be mounted on the mounting base 140 to capture movement of the robotic limb 102. As further depicted by FIG. 1, the robotic system 100 may include an onboard computing system 152 that may be utilized for the operation of the robotic limb 102, in accordance with the presently disclosed embodiments. The onboard computing system may track multiple components of a robotic limb, such as joints, end-effectors, grippers, fingers, etc., and adjusts their pose accordingly until a desired pose is reached. A pose may include either of, or both of, the position in three-dimensional (3D) space and the orientation of the one or more components of the robotic limb. In particular embodiments, while the onboard computing system 152 is shown separate from the robotic limb, one or more components of the onboard computing system 152 may be located within the robotic limb 102. As an example and not by way of limitation, one or more motors and actuators 160 may be enclosed in the joint 110 section of the robotic limb 102. As another example and not by way of limitation, the power source 168 may be located within the mounting base 140. In particular embodiments, one or more components of the robotic system 100 may be included in another component of the robotic system 100. As an example and not by way of limitation, while sensors 150 are shown to be separate from the robotic limb 102, sensors 150 may be included in one or more components of the robotic limb 102.

For example, in some embodiments, the onboard computing system 152 may include, among other things, one or more processor(s) 154, memory 156, sensors 158, one or more motors and actuators 160, a display 162, input structures 164, network interfaces 166, a power source 168, and an input/output (I/O) interface 170. It should be noted that FIG. 1 is merely one example of a particular implementation and is intended to illustrate the types of components that may be present in the robotic system 100. As depicted, the one or more processor(s) 154 may be operably coupled with the memory 156 to perform various algorithms for instructing the robotic limb 102 to perform different operations. Such programs or instructions executed by the processor(s) 154 may be stored in any suitable article of manufacture that includes one or more tangible, computer-readable media at least collectively storing the instructions or routines, such as the memory 156. The memory 156 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 154 to enable the robotic limb 102 to perform various functionalities.

In certain embodiments, the sensors 158 may include, for example, one or more cameras (e.g., depth cameras), touch sensors, microphones, motion detection sensors, thermal detection sensors, light detection sensors, time of flight (ToF) sensors (e.g., LiDAR system), ultrasonic sensors, infrared sensors, or other similar sensors that may be utilized to detect various user inputs (e.g., user voice inputs, user gesture inputs, user touch inputs, user instrument inputs, user motion inputs, and so forth). The motors and actuators 160 may include any number of electronic motors (e.g., DC motors) that may be utilized to drive actuators, which may allow the robotic limb 102 to perform various mechanical operations and/or motional operations (e.g., walking, head and neck motions, limb and joint motions, body motions, dance motions, eye motions, and so forth). The display 162 may include any display architecture (e.g., LCD, OLED, e-Ink, and so forth), which may provide further means by which users may interact and engage with the robotic limb 102.

In certain embodiments, the input structures 164 may include any physical structures utilized to control one or more global functions of the robotic limb 102 (e.g., pressing a button to power "ON" or power "OFF" the robotic limb 102). The network interface 166 may include, for example, any number of network interfaces suitable for allowing the robotic limb 102 to access and receive data over one or more cloud-based networks (e.g., a cloud-based service that may service hundreds or thousands of the robotic limb 102 and the associated users corresponding thereto) and/or distributed networks. The power source 168 may include any suitable source of power, such as a rechargeable lithium polymer (Li-poly) battery and/or an alternating current (AC) power converter that may be utilized to power and/or charge the robotic limb 102 for operation. Similarly, the I/O interface 170 may be provided to allow the robotic limb 102 to interface with various other electronic or computing devices, such as one or more auxiliary electronic devices.

In particular embodiments, the onboard computing system 152 may instruct the robotic limb 102 to achieve a desired pose. The onboard computing system 152 may access sensor data representing a scene from one or more sensors. These sensors may comprise for example and not by way of limitation, one or more three-dimensional (3D) cameras, LIDAR, DVS, or RGB-D cameras. In particular embodiments, the sensor data may comprise image data (such as RGB-D or depth images). In particular embodiments, non-image based data (such as RFID data) may be used instead of, or in conjunction with, the image data. The sensor data may represent a scene that includes a least a portion of the robotic limb 102 that can thus be utilized by the computing device for various functions related to pose of the robotic limb 102. This disclosure contemplates that the one or more sensors can be located on the robotic limb 102 or external to the robotic limb 102, or both. Other sensors for sensing the pose of the robotic limb 102 may be built into the robotic system 100 of which the limb 102 is a part, and may include joint encoders, computation encoders, limit switches, motor current sensors, or any suitable combination thereof.

In particular embodiments, the onboard computing system 152 may isolate at least a portion of the sensor data that represents at least a portion of the robotic limb 102. As an example and not by way of limitation, this may be completed through a point cloud technique. In particular embodiments, the onboard computing system 152 may use 3D depth sensor data to record one or more snapshots of the point cloud of positional data points of the scene. These data points may include information about one or more external surfaces contained in the scene, including the external surfaces of the robotic limb 102, the table surface, and one or more objects contained in the scene. From this, the onboard computing system 152 may isolate a two-dimensional (2D) region that contains at least a portion of one or more objects contained within the scene. From at least a portion of the sensor data, the onboard computing system 152 may create one or more RGB-D clusters of various objects in the scene. In particular embodiments, the one or more RGB-D clusters of various objects includes the robotic limb 102 contained within the scene.

In particular embodiments, the scene may contain one or more objects that are further isolated by the onboard computing system 152. Upon isolating the one or more objects in the scene, the onboard computing system 152 may classify the one or more RGB-D clusters of various objects in the scene created from the portion of the sensor data. This classification may be conducted by the onboard computing system 152 via any method of classification, including for example and not by way of limitation manual identification by a user or any method of artificial intelligence, including computer vision, machine learning, neural networks, or deep learning. Variations of neural networks utilized for classification may include, for example and not by way of limitation, three-dimensional segmentation networks (3DSNs) such as three-dimensional convolutional neural networks (3DCNNs), Deep Kd-networks, regional convolutional neural networks (RCNNs), or recurrent neural networks (RNNs). In particular embodiments, this classification may determine that at least one of the one or more objects within a scene is a robotic limb 102. In particular embodiments, the onboard computing system 152 may additionally classify other objects contained within a scene, including for example but not by way of limitation, a coffee mug, a bottle, a vase, a spoon, a plate, a screwdriver, a light bulb, a hand or arm, etc.

While the present embodiments may be discussed below primarily with respect to a robotic limb, it should be appreciated that the present techniques may be applied to any of various robotic devices that may perform various operations to provide services to users. In particular embodiments, the robotic device may comprise any electronic device or computing device that may be configured with computer-based intelligence (e.g., machine learning [ML], artificial intelligence [AI], deep learning, cognitive computing, artificial neural networks [ANN], and so forth), which may be utilized by the robotic device to perform operations to provide services to users through, for example, motions, actions, gestures, body movements, facial expressions, limb and joint motions, display changes, lighting, sounds, and so forth. For example, in one embodiment, a robotic device may include a robot, a robotic limb, or similar AI or cognitive computing device that may be provided to contextually interact, instruct, operate, and engage with (e.g., in real-time or near real-time), for example, humans, pets, other robotic electronic devices, one or more servers, one or more cloud-based services, home appliances, electronic devices, automobiles, and so forth. Furthermore, as used herein, a robotic device may refer to any autonomous or semi-autonomous computing device capable of performing one or more mechanical and/or electromechanical motions or movements (e.g., human-like motions and movements) in response to, for example, one or more user inputs, one or more user commands (e.g., voice commands, gesture commands), one or more triggers (e.g., a time trigger, a keyword trigger, a tonal trigger, a user emotional response trigger, user motional trigger, a location trigger, an environmental trigger), and so forth.

Adaptive Robotic Motion Control

In particular embodiments, the disclosed technology includes a system for adaptive motion control. The adaptive motion control may be used for robotic systems. As an example and not by way of limitation, the adaptive motion control may be used for a robotic limb of a robotic system. In particular embodiments, robotic planning software used for robotic motion control may often determine a desired path for a robot system to perform. The path may be a set of poses in sequential order. In particular embodiments, a pose may define the position of every joint to represent the complete robot system position. As an example and not by way of limitations, if a robot system includes five joints, then the pose of the robotic system may be [18°, 30°, 16°, 45°, 80°]. An example path may include several poses of the robotic system, such as [18°, 45°, 56°, 45°, 60°], [18°, 50°, 60°, 50°, 65°], and [20°, 50°, 60°, 54°, 65°]. In particular embodiments, a process called time parameterization may be used to associate times with each pose in a path. In particular embodiments, the times may be determined based on pre-configured limits of the robotic system. As an example and not by way of limitation, one or more of a velocity, acceleration, and torque of one or more components of a robotic system may be used to determine times associated with a set of poses in a path. In particular embodiments, the trajectory may be a combination of the path with the associated times. As an example and not by way of limitation, the trajectory may be a path with a time associated with each pose of the path. In particular embodiments, the robotic planning software may communicate a desired trajectory to a robotic motion controller. The robotic motion controller may manage the trajectory execution on physical hardware. As an example and not by way of limitation, the robotic motion controller may send driving commands to one or more actuators of the robotic system. The robotic motion controller may use the trajectory received from the robotic planning software to determine a desired state for each joint at each time step. Subsequently, the robotic motion controller may command the actuators of a robotic system to achieve the desired states (i.e., send driving commands to the actuators). The driving commands to the actuators of the robotic system may result in motion in the robotic joins of the robotic system. Although this disclosure describes robotic motion control in a particular manner, this disclosure contemplates robotic motion control in any suitable manner.

Certain technical challenges exist for robotic motion control. One technical challenge may include a need to characterize each actuator's capabilities. In order to accurately plan and generate a trajectory for a robotic system, the planning software may require many configuration parameters for each actuator. Additionally, actuator capabilities may be complicated and interrelated, and as such oversimplifications may be used. The solution presented by the embodiments disclosed herein to address this challenge may be to eliminate the need to accurately predict the capabilities of the robotic system. To do so, the robotic motion controller may be configured to monitor the progress of all actuators of the robotic system in real-time and automatically adjust the execution of the planned path of the trajectory to adhere to the planned path without strictly adhering to the planned times. Another technical challenge may include avoiding unachievable trajectories. For instance, if a robotic planning software plans an initial trajectory that one or more robotic actuators are not capable of achieving, then the trajectory cannot be executed as planned. The result of not being able to execute a trajectory as planned may be the actuators moving out of sync and reaching poses that were not intended. This may especially be troublesome when the failure to execute the trajectory results in potential collisions of one or more limbs, failure to maintain intended constraints, failure to achieve desired path, etc. As an example and not by way of limitation, if maintaining a specific angle of an end effector was an intended constraint, then, the robotic system may potentially spill a liquid (e.g., a cup of water) because it was unable to maintain an angle of the end effector (e.g., a platform/limb that is holding a cup of water). The solution presented by the embodiments disclosed herein to address this challenge may be to detect lag of an actuator by continually monitoring actuators of a robotic system. The detection of a lag of an actuator may be used to adjust the execution of a given path or trajectory in real-time based on the real-time feedback of the robotic system. As an example and not by way of limitation, the speed of the trajectory execution may be reduced to an achievable level for all actuators.

Certain embodiments disclosed herein may provide one or more technical advantages. A technical advantage of the embodiments may include removing a requirement that a robotic motion controller needs special configurations to respond to changing internal factors or changing external factors. This technical advantage is achieved because the execution of a planned trajectory is adjusted in real-time instead of requiring many capabilities and/or predicting capabilities of a robotic system. Another technical advantage of the embodiments may include enabling a robotic motion controller to more easily, safely, and reliably execute a planned path at speeds that are close to actuators' limits. This technical advantage is achieved because while many robotic systems may use reduced speeds far lower than actuator limits to mitigate issues of actuators moving out of sync, the embodied robotic system may execute trajectories at close to actuator limits and adjust the execution of the trajectory in real-time to still achieve the planned path of a trajectory. Certain embodiments disclosed herein may provide none, some, or all of the above technical advantages. One or more other technical advantages may be readily apparent to one skilled in the art in view of the figures, descriptions, and claims of the present disclosure.

In particular embodiments, a robotic system may access a trajectory plan to be executed by the robotic system. As an example and not by way of limitation, the robotic system may use a robotic planning software to determine a trajectory of the robotic system to perform a task and access that trajectory plan. In particular embodiments, the trajectory plan may include one or more desired poses at one or more specified times, respectively for each of one or more actuators of the robotic system. In particular embodiments, the robotic system may access one or more capabilities of the respective actuator. In particular embodiments, the robotic system may plan one or more desired poses at the one or more specified times, respectively for each of the one or more actuators based on the one or more capabilities of the respective actuators. In particular embodiments, the robotic system may determine one or more updated values for the capabilities of each lagging actuator. In particular embodiments, the robotic system may update the capabilities of the actuators based on the updated values. Although this disclosure describes accessing a trajectory plan in a particular manner, this disclosure contemplates accessing a trajectory plan in any suitable manner.

In particular embodiments, the robotic system may execute the trajectory plan for each of the one or more actuators of the robotic system. As an example and not by way of limitation, the robotic system may use a robotic motion controller to send driving commands to each actuator of the robotic system to execute the trajectory plan. Although this disclosure describes executing a trajectory plan in a particular manner, this disclosure contemplates executing a trajectory plan in any suitable manner.

In particular embodiments, the robotic system may monitor an actual pose of all actuators of the robotic system. In particular embodiments, the robotic system may monitor the actual pose of one or more actuators in real-time during execution of the trajectory plan. In particular embodiments, the robotic system may use one or more sensors to monitor the actual pose of the one or more actuators. As an example and not by way of limitation, the robotic system may use a rotary encoder to determine a pose of the one or more actuators. In particular embodiments, the robotic system may monitor a velocity of each actuator. As an example and not by way of limitation, the determine a velocity of the actuator based on a camera-based positioning system. Although this disclosure describes monitoring an actual pose of the actuators in a particular manner, this disclosure contemplates monitoring an actual pose of the actuators in any suitable manner.

In particular embodiments, the robotic system may determine one or more actuators is lagging. In particular embodiments, the robotic system may determine that one or more actuators is lagging based on the monitoring done on the actuators. In particular embodiments, the actual pose of each lagging actuator deviates from a desired pose by more than an error threshold. As an example and not by way of limitation, if the error threshold is 2° and the robotic system detects one actuator is deviating from a desired pose by 3° for the particular time, then the robotic system may identify that actuator as a lagging actuator. In particular embodiments, the error threshold may be set to zero. As an example and not by way of limitation, when the robotic system detects one actuator is deviating from a desired pose by any amount greater than 0°, then the robotic system may identify that actuator as a lagging actuator. In particular embodiments, the robotic system may determine an actuator is lagging based on monitoring the velocity of the one or more actuators. Similarly to using pose, the robotic system may determine an actuator is lagging if a lagging actuator deviates from a desired velocity by more than an error threshold. In particular embodiments, the robotic system may compare an actual pose of an actuator to a desired pose of the respective actuator at a specific time according to the trajectory plan. By using the trajectory plan, the robotic system may identify a desired pose for an actuator at a given time and if the respective actuator deviates from the desired pose (or velocity, acceleration, other feedback, etc.) by more than an error threshold. Although this disclosure describes determining one or more actuators is lagging in a particular manner, this disclosure contemplates determining one or more actuators is lagging in any suitable manner.

In particular embodiments, the robotic system may adjust one or more desired poses at one or more specified times of a trajectory plan. In particular embodiments, the robotic system may in real-time responsive to determining that an actuator is lagging, adjust a desired pose at one or more specified times of the trajectory plan. As an example and not by way of limitation, if the lagging actuator is deviating from the desired pose by an error value, the robotic system may adjust the desired pose of all the actuators for one or more specified times to maintain a path of the trajectory plan. To maintain the path of the trajectory plan, the robotic system may not adhere to the original desired time associated with each pose of the original trajectory plan. In particular embodiments, the robotic system may determine a deviation of the actual pose of each lagging actuator and desired pose has fallen below an error threshold. The robotic system may adjust the desired poses at one or more specified times of the trajectory plan in response to determining the deviation has fallen below the error threshold. In particular embodiments, the size of an adjustment of the one or more actuators is based on a size of a deviation between the actual pose of a lagging actuator and the desired pose of the respective actuator. As an example and not by way of limitation, if the lagging actuator is deviating from the desired pose by 3° the adjustment to the trajectory plan would be based on the 3° deviation. Although this disclosure describes adjusting one or more desired poses at one or more specified times of a trajectory plan in a particular manner, this disclosure contemplates adjusting one or more desired poses at one or more specified times of a trajectory plan in any suitable manner.

Figure 2:
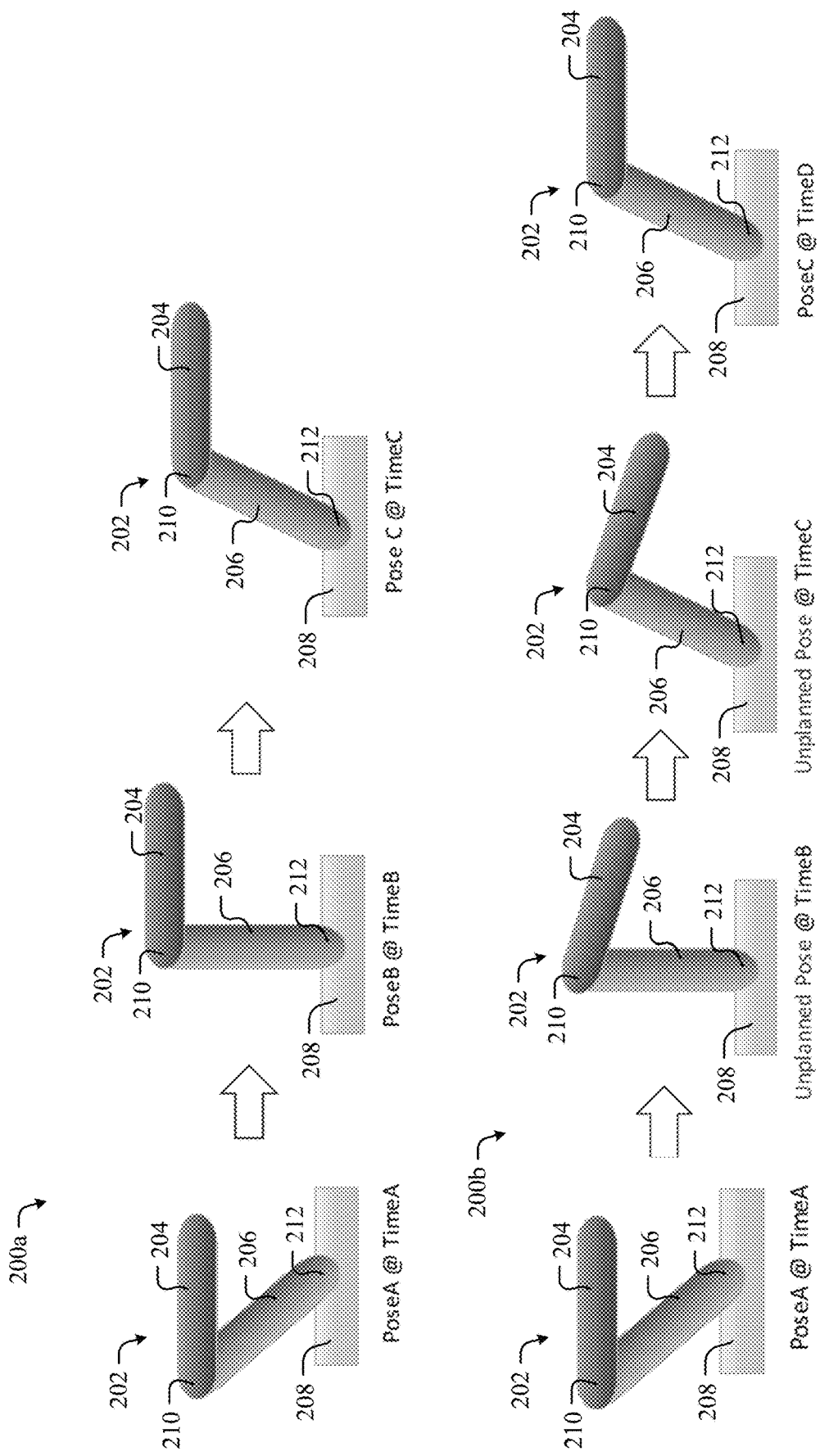
FIG. 2 illustrates an example comparison between two different functioning robotic limbs.

FIG. 2 illustrates an example comparison between two different functioning robotic limbs 202. In particular embodiments, the robotic limbs 202 may be embodied as the robotic limb 102 of FIG. 1. In particular embodiments, two instances 200a, 200b of a robotic limb 202 executing a trajectory plan is shown. While this disclosure may describe the robotic limb 202 performing one or more functions, this disclosure may contemplate the robotic limb 202 performing the one or more functions using an onboard computing system 152 with sensors 150. In particular embodiments, the robotic limb 202 may use a robotic motion controller to perform one or more functions. In a first instance 200a, the robotic limb 202 experiences no issue and is able to execute the trajectory plan. In a second instance 200b, the robotic limb 202 may fail to execute the trajectory plan. In particular embodiments, the robotic limb 202 may include a first limb segment 204 (e.g., limb segment 105 of FIG. 1), a second limb segment 206 (e.g., limb segment 105 of FIG. 1), and a mounting base 208 (e.g., mounting base 140 of FIG. 1). In particular embodiments, the limb segments 204, 206 may be connected by a joint 110, and the limb segment 206 may be connected to the mounting base 208 by another joint 110. In particular embodiments, the joint 110 between the limb segments 204, 206 may comprise an actuator 210. In particular embodiments, the joint 110 between the limb segment 206 and the mounting base 208 may comprise an actuator 212. In the first instance 200a, the robotic limb 202 may have actuators 210, 212 that are able to execute the trajectory plan. As shown in the first instance 200a, the robotic limb 202 may drive the actuators 210, 212 to a pose A at a time A, a pose B at a time B, and a pose C at a time C to complete the trajectory plan. In the second instance 200b, the actuator 210 may be a lagging actuator where the actuator 210 may not be able to execute the trajectory plan. As shown in the second instance 200b, the robotic limb 202 may drive the actuators 210, 212 to a pose A at time A, an unplanned pose at time B, another unplanned pose at time C, and a pose C at a time D. This may be the result of one or more factors as described herein. For instance, the actuator 210 capabilities may have changed over time and requires updating. As such, the second instance 200b shows that a lagging actuator (e.g., actuator 210) may result in a failed executed trajectory plan. The lagging actuator (e.g., actuator 210) may move out of sync with actuator 212, which causes the failed executed trajectory plan. While the robotic limb 202 is able to drive the actuators 210, 212 to the end pose C, the actuator 210 causes the robotic limb 202 to arrive at the end pose C at a later time D. This may result in one or more issues as described herein. As an example and not by way of limitation, the robotic limb 202 is unable to maintain a constraint, such as maintaining an angle with the limb segment 204 due to the actuators 210, 212 moving out of sync. For instance, if the constraint was to maintain the limb segment 204 as a level surface (e.g., for holding a cup of water), then the limb segment 204 would fail to adhere to the constraint.

Figure 3:
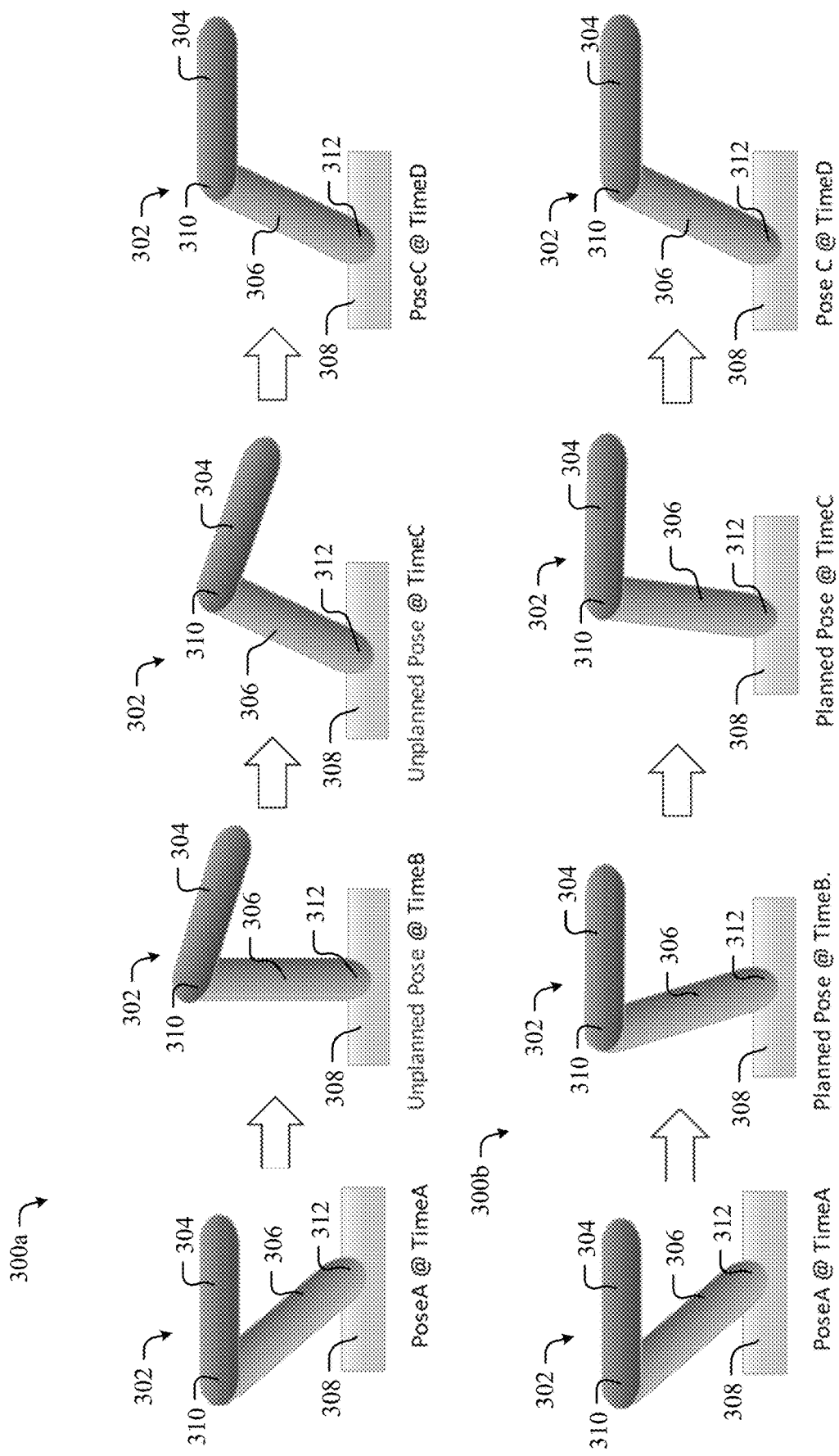
FIG. 3 illustrates another example comparison between two different functioning robotic limbs.

FIG. 3 illustrates another example comparison between two different functioning robotic limbs 302. In particular embodiments, the robotic limbs 302 may be embodied as the robotic limb 102 of FIG. 1. In particular embodiments, the two instances 300a, 300b of a robotic limb 302 executing a trajectory plan are shown. While this disclosure may describe the robotic limb 302 performing one or more functions, this disclosure may contemplate the robotic limb 302 performing the one or more functions using an onboard computing system 152 with sensors 150. In particular embodiments, the robotic limb 302 may use a robotic motion controller to perform one or more functions. In a first instance 300a, the robotic limb 302 may experience an issue and is unable to execute the trajectory plan similarly to the second instance 200b of FIG. 2. In a second instance 300b, robotic limb 302 may adjust a desired pose of a trajectory plan to maintain planned poses of the trajectory plan while not necessarily adhering to the planned times of the trajectory plan. In particular embodiments, the robotic limb 302 may include a first limb segment 304 (e.g., limb segment 105 of FIG. 1), a second limb segment 306 (e.g., limb segment 105 of FIG. 1), and a mounting base 308 (e.g., mounting base 140 of FIG. 1). In particular embodiments, the limb segments 304, 306 may be connected by a joint 110, and the limb segment 306 may be connected to the mounting base 308 by another joint 110. In particular embodiments, the joint 110 between the limb segments 304, 306 may comprise an actuator 310. In particular embodiments, the joint 110 between the limb segment 306 and the mounting base 308 may comprise an actuator 312. Similarly to the second instance 200b of FIG. 2, in the first instance 300a, the actuator 310 may be a lagging actuator where the actuator 310 may not be able to execute the trajectory plan. As shown in the first instance 300a, the robotic limb 302 may drive the actuators 310, 312 to a pose A at time A, an unplanned pose at time B, another unplanned pose at time C, and a pose C at a time D. To address the issue of having a lagging actuator, the robotic limb 302 may adjust the trajectory plan in real-time to adhere to the planned poses of the trajectory plan while it may not necessarily adhere to the planned times of the trajectory plan. In the second instance 300b, the robotic limb 302 may drive the actuators 310, 312 to a pose A at time A. While initially driving the actuators 310, 312 to pose A, the robotic limb 302 via an onboard computing system 152 and sensors 150 may monitor the actuators 310, 312. Upon detection of a lagging actuator 310, the robotic limb 302 may adjust the desired poses of one or more actuators the trajectory plan. Instead of following the instance 300a, the robotic limb 302 is able to execute the trajectory plan by adhering to the planned poses of the trajectory plan in instance 300b albeit at a slower time.

Figure 4:
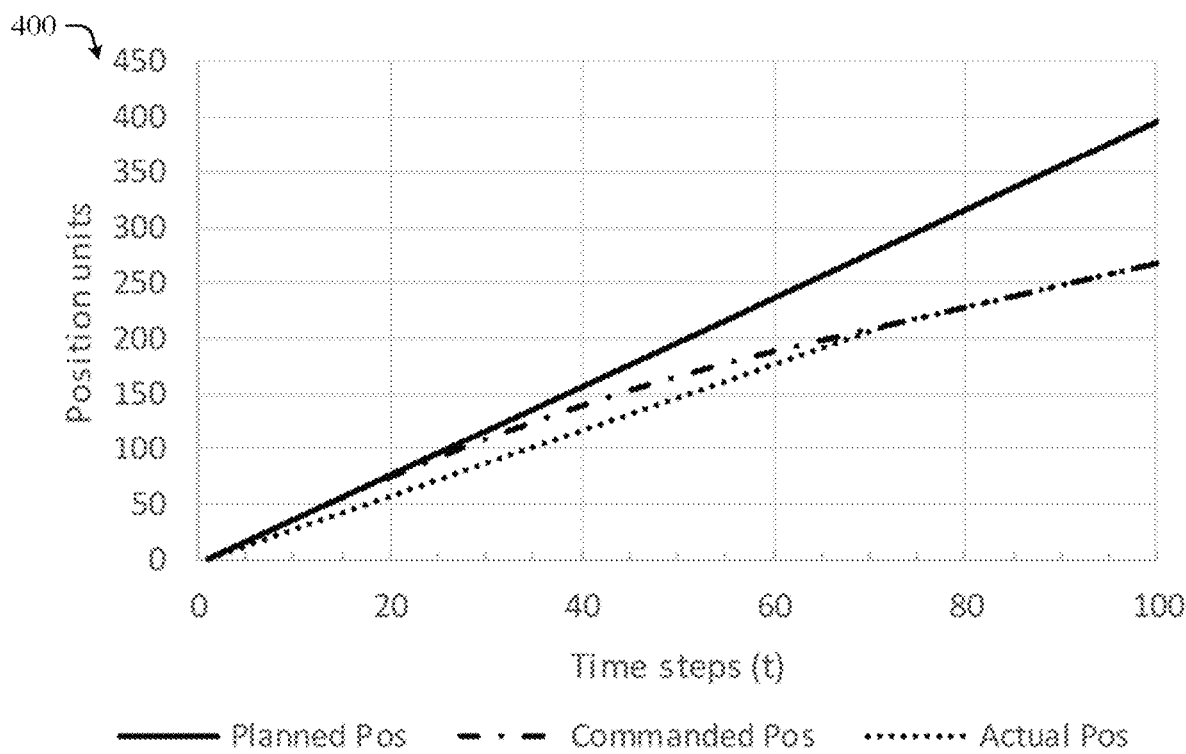
FIG. 4 illustrates example graphs of an operating robotic limb.
Figure 4:
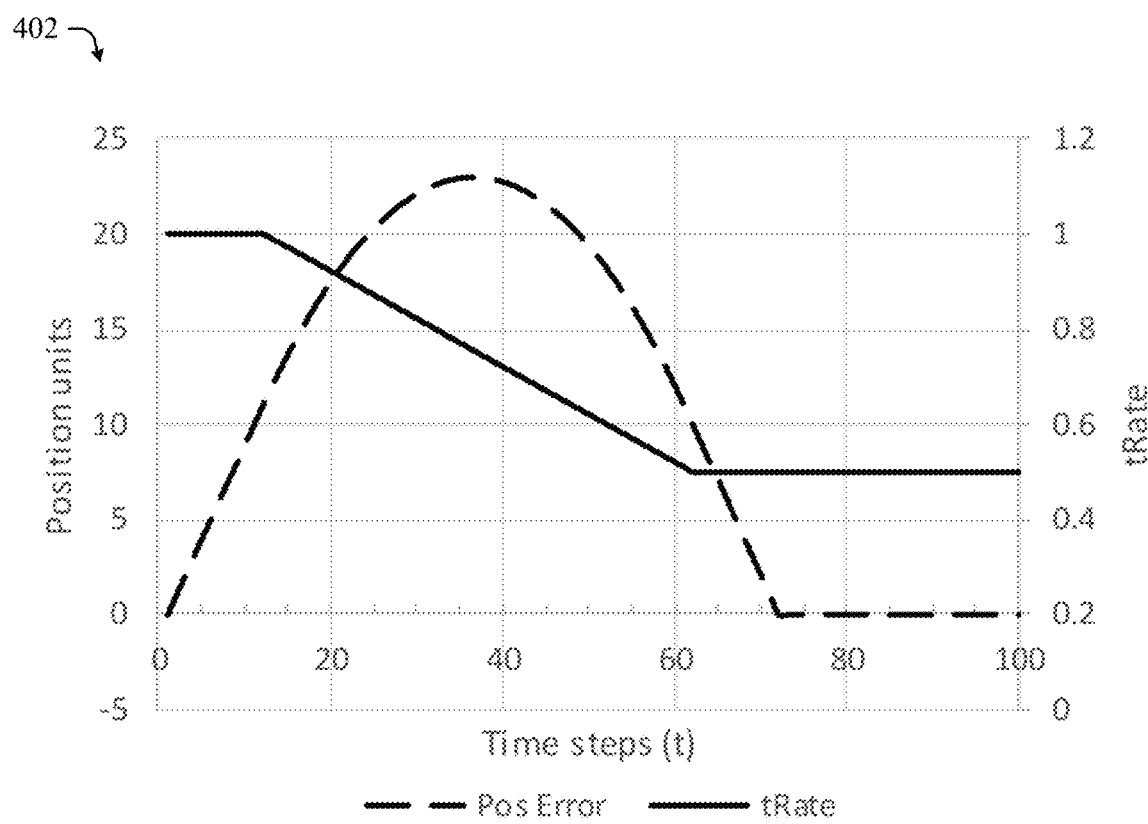

FIG. 4 illustrates example graphs 400, 402 of an operating robotic limb. In particular embodiments, the operating robotic limb may be embodied as robotic limb 302 executing a trajectory plan in the second instance 300b. The operating robotic limb may use an onboard computing system 152 with sensors 150 to perform one or more functions described herein. In particular embodiments, the operating robotic limb may use a robotic motion controller to perform one or more functions described herein. In particular embodiments, a position graph 400 of an operating robotic limb is shown to include a planned position, a commanded position, and an actual position. The position units may be embodied as any unit to measure the change in position of an actuator. As an example and not by way of limitation, the position unit may be embodied as millimeters. The time may be embodied as any unit of time. As an example and not by way of limitation, the time unit may be embodied as seconds. In particular embodiments, the planned position may be based on the trajectory plan comprising desired positions along time t. In particular embodiments, the commanded position may be based on the driving commands that the robotic limb (e.g., via a robotic motion controller) needs to send to the actuator to achieve the desired position. In particular embodiments, the actual position may be based on sensor data of the position of the actuator. In particular embodiments, the position graph 400 may be for a lagging actuator. As shown in the position graph, all three positions may initially start together. However, as the operating robotic limb executes a trajectory plan, the actual position of the actuator starts to lag behind the planned position as indicated by the separation between the planned position and the actual position in the position graph 400. This lag may be the result of the actuator's maximum speed being a fraction of the commanded speed. As such, the robotic limb (using a robotic motion controller and/or onboard computing system 152) may identify the lagging actuator and change the commanded execution rate of the trajectory plan for the actuator to achieve an updated desired position. The commanded position may correspond to a desired updated position of the actuator.

In particular embodiments, a position error graph 402 is shown to include the position error and tRate. The position error graph 402 may be plotted along the same timeline as the position graph 400 and correspond to the same lagging actuator. The position error may be measured in the same position units as graph 400. tRate may be a rate at which the trajectory increases, where it is initialized at 1 if it is following the trajectory exactly. As shown in the position error graph 402, tRate may initially be set to 1 where the actuator is commanded to follow the trajectory plan. However, as a result of the actuator's maximum speed being a fraction of the commanded speed, a position error starts to build between the actual position of the actuator and the commanded position. After the robotic limb detects (using the onboard computing system 152 and sensors 150) the lagging actuator, the robotic limb may change the commanded speed by reducing tRate to a fraction of the execution speed of the original trajectory. As shown, the robotic limb may gradually reduce tRate to reduce the position error between the commanded position and the actual position. In addition to changing tRate, the robotic limb may update the commanded position based on the new tRate. The position error gradually reduces to 0 when the actual position of the actuator matches the commanded position. This may occur when tRate is at an execution speed that is compatible with the actuator.

Figure 5:
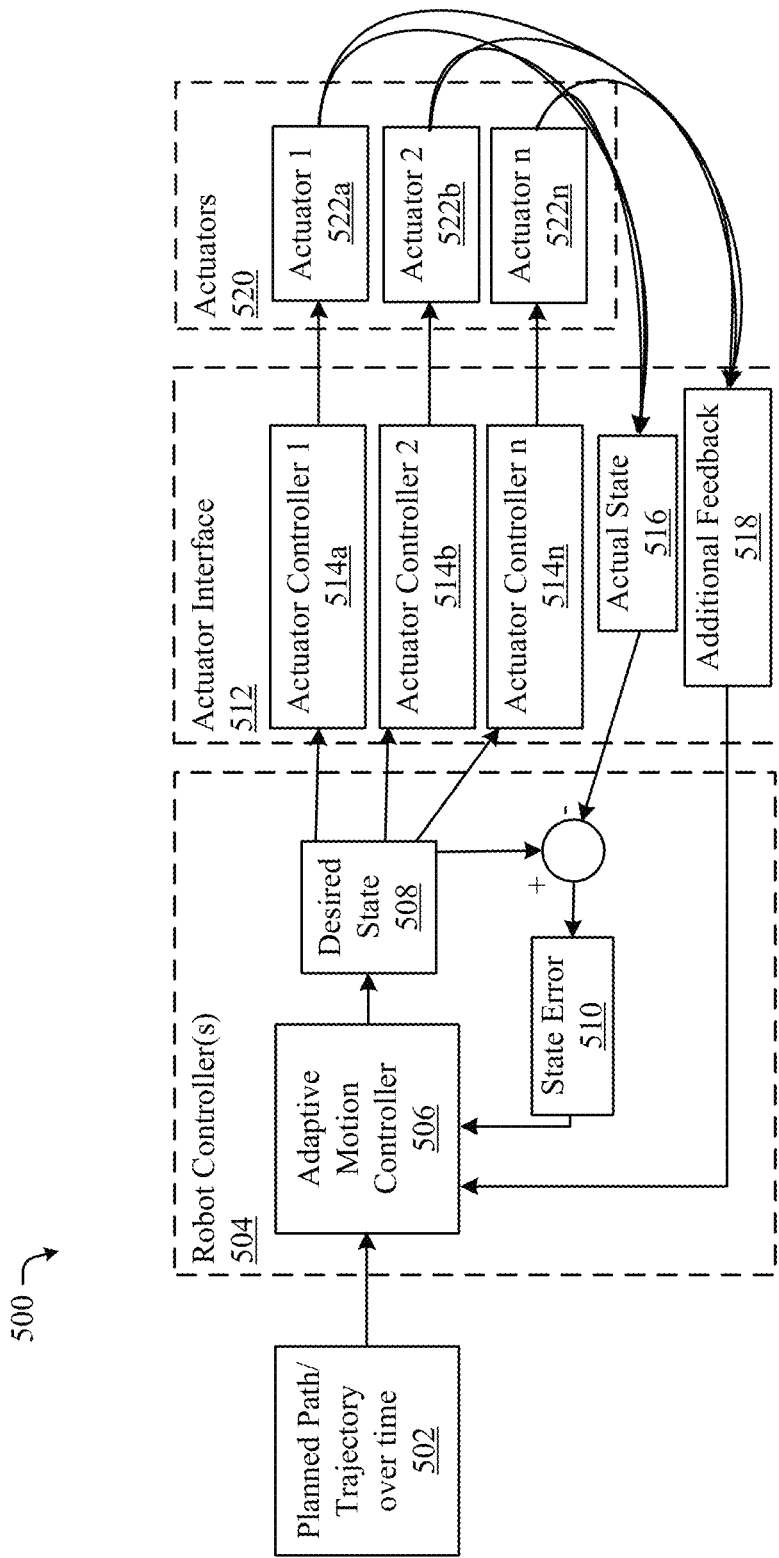
FIG. 5 illustrates an example system of adaptive robotic motion control.

FIG. 5 illustrates an example system 500 of adaptive robotic motion control. In particular embodiments, the system 500 may be embodied as a robotic system similar to robotic system 100. The example system 500 may comprise a planned path/trajectory over time 502, robot controller(s) 504, actuator interface 512, and actuators 520. In particular embodiments, the example system 500 may receive the planned path/trajectory 502 from a robotic planning software that determines the planned path/trajectory 502 based on a task that the system 500 has to perform. While robotic planning software is not shown, the system 500 may include the robotic planning software. As an example and not by way of limitation, if the system 500 is a robotic system comprising a robotic limb and is tasked to perform a pick up function (e.g., picking up a cup of water), then a robotic planning software may determine a planned path/trajectory 502 for the system 500 to perform the task of the pick up function. In particular embodiments, the robot controller(s) 504 may include an adaptive motion controller 506, a desired state 508, an operation, and a state error 510. In particular embodiments, the actuator interface 512 may include several actuator controllers 514, an actual state 516, and additional feedback 518. In particular embodiments, the actuators 520 may include several actuators 522.

The planned path/trajectory 502 may be sent to the adaptive motion controller 506 of the robot controller(s) 504. The adaptive motion controller 506 may send commands to the actuator controllers 514 of the actuator interface 512 via the desired state 508. The desired state 508 may indicate one or more desired poses of the actuators 522 at one or more specified times. The adaptive motion controller 506 may generate a desired state 508 of one or more actuators 522 based on the planned path/trajectory 502 and send the desired state 508 to the actuator controllers 514. The actuator controllers 514 may send driving commands to their respective actuators 522 (e.g., actuator controller 1 514a sends a driving command to actuator 1 522a, actuator controller 2 514b sends a driving command to actuator 2 522b). In particular embodiments, the actuators 522 may send state information to the actual state 516 of the actuator interface 512. The actual state 516 may track the state information of the actuators 522. As an example and not by way of limitation, the actual state 516 may track the actual position of each actuator 522, velocity of each actuator 522, acceleration of each actuator 522, or other state information of the actuator 522. In particular embodiments, there may be additional sensors or measurement components coupled to any component of the system 500 to determine the state information of the actuators 522. As an example and not by way of limitation, a rotary encoder may be coupled to actuator 1 522a to determine an actual position of the actuator 1 522a, which is then sent to the actual state 516. In particular embodiments, the actual state 516 may be sent to an operation of the robot controller(s) 504 to determine state error 510. In particular embodiments, the actuators 522 may send additional feedback 518 to the actuator interface 512. The additional feedback 518 may be other information that may be used to accurately determine a desired state 508 for the actuators 522. In particular embodiments, the additional feedback 518 may be sent to the adaptive motion controller 506 of the robot controller(s) 504.

In particular embodiments, the state error 510 may be determined based on the desired states 508 and the actual state 516. In particular embodiments, an operation may be used to subtract information from the actual state 516 from the desired state 508. As an example and not by way of limitation, if the desired state 508 includes information corresponding to desired poses for each actuator 522 for each time t, then the actual state 516 may include information corresponding to the actual pose for each actuator 522 for each time t. The state error 510 may be the difference between the desired pose and the actual pose for each actuator for each time t. The adaptive motion controller 506 may receive the state error 510 and adjust the desired state 508 to reduce the state error 510. The adjusted desired state 508 may then be sent to the actuator controllers 514 which will send updated driving commands to the actuators 522. The actual state 516 may be updated and a new state error 510 may be calculated from the updated desired state 508 and updated actual state 516. This feedback loop may continue to iterate until the state error 510 falls below an error threshold.

Figure 6:
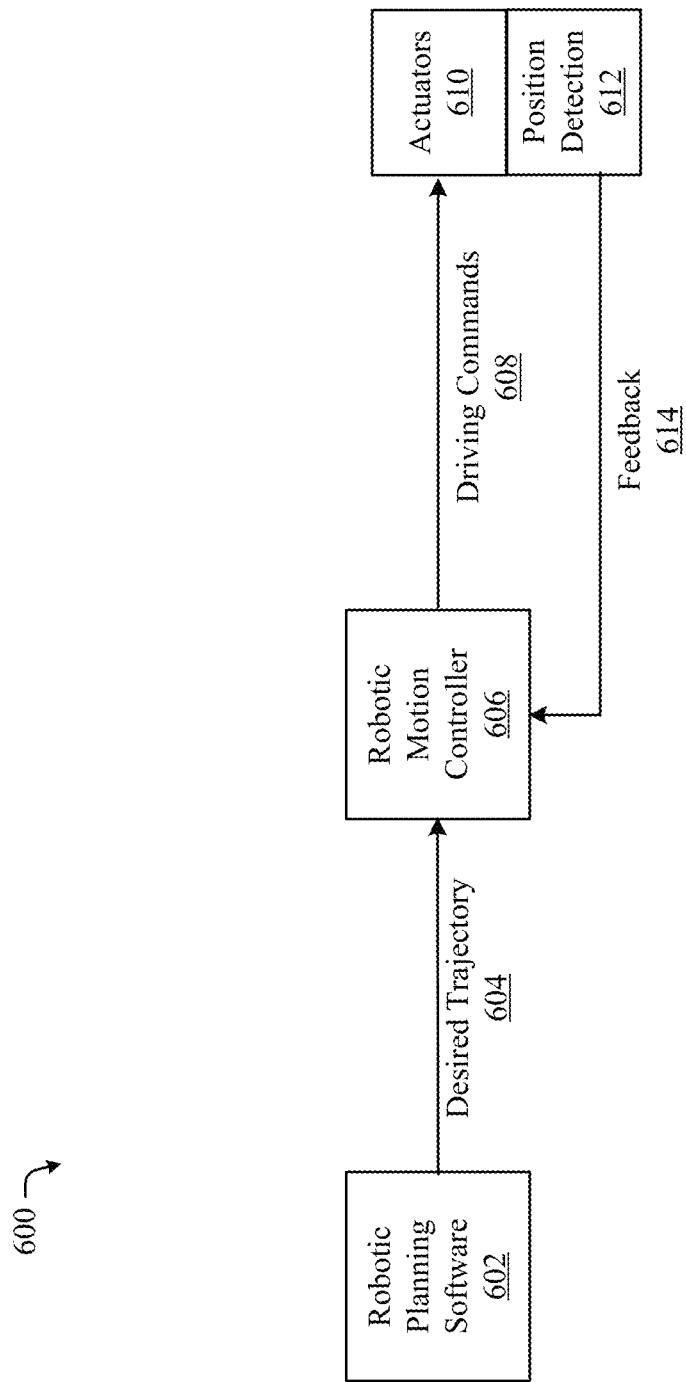
FIG. 6 illustrates another example system of adaptive robotic motion control.
Figure 7A:
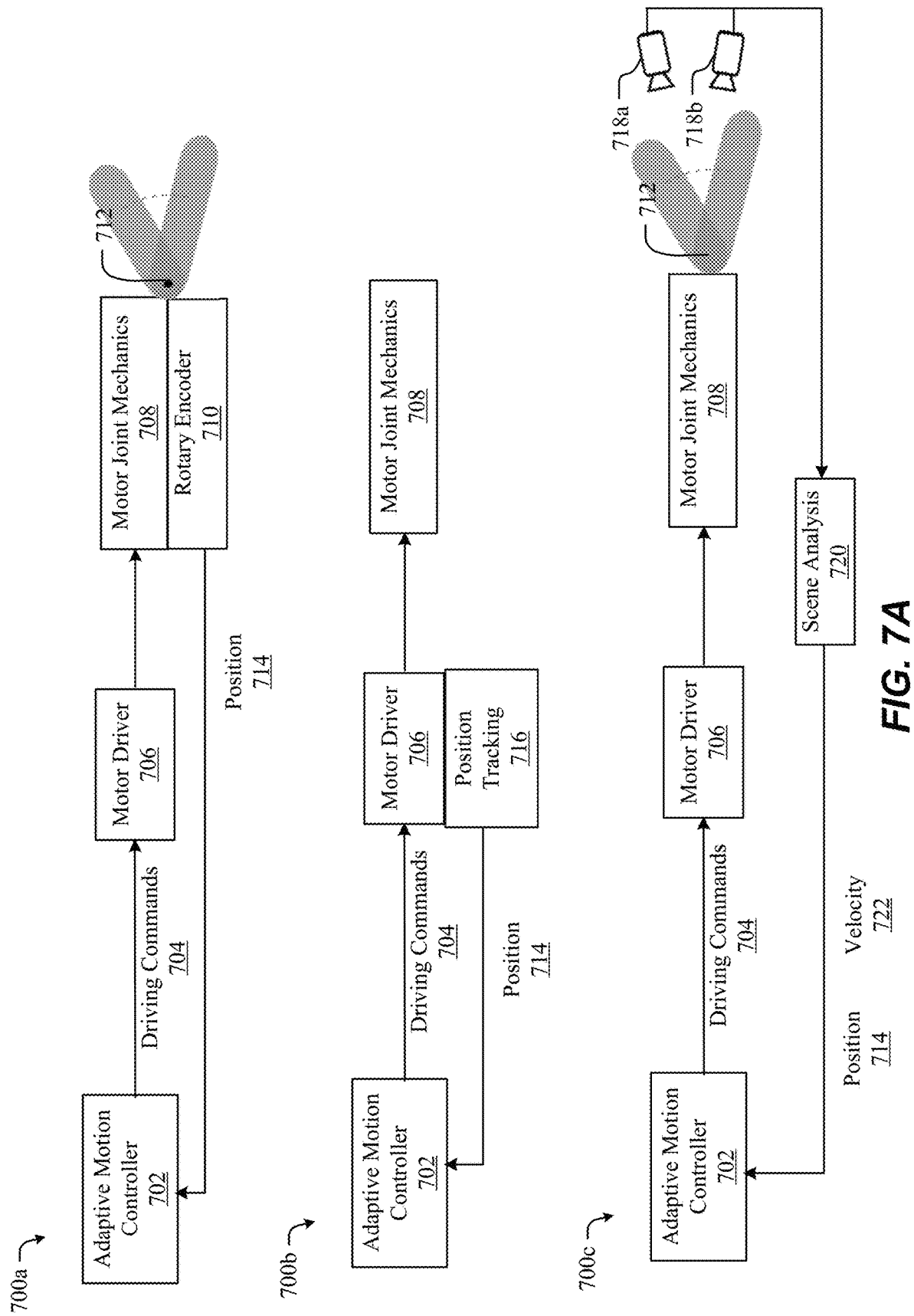
FIGS. 7A-7B illustrate example systems of adaptive robotic motion control.
Figure 7B:
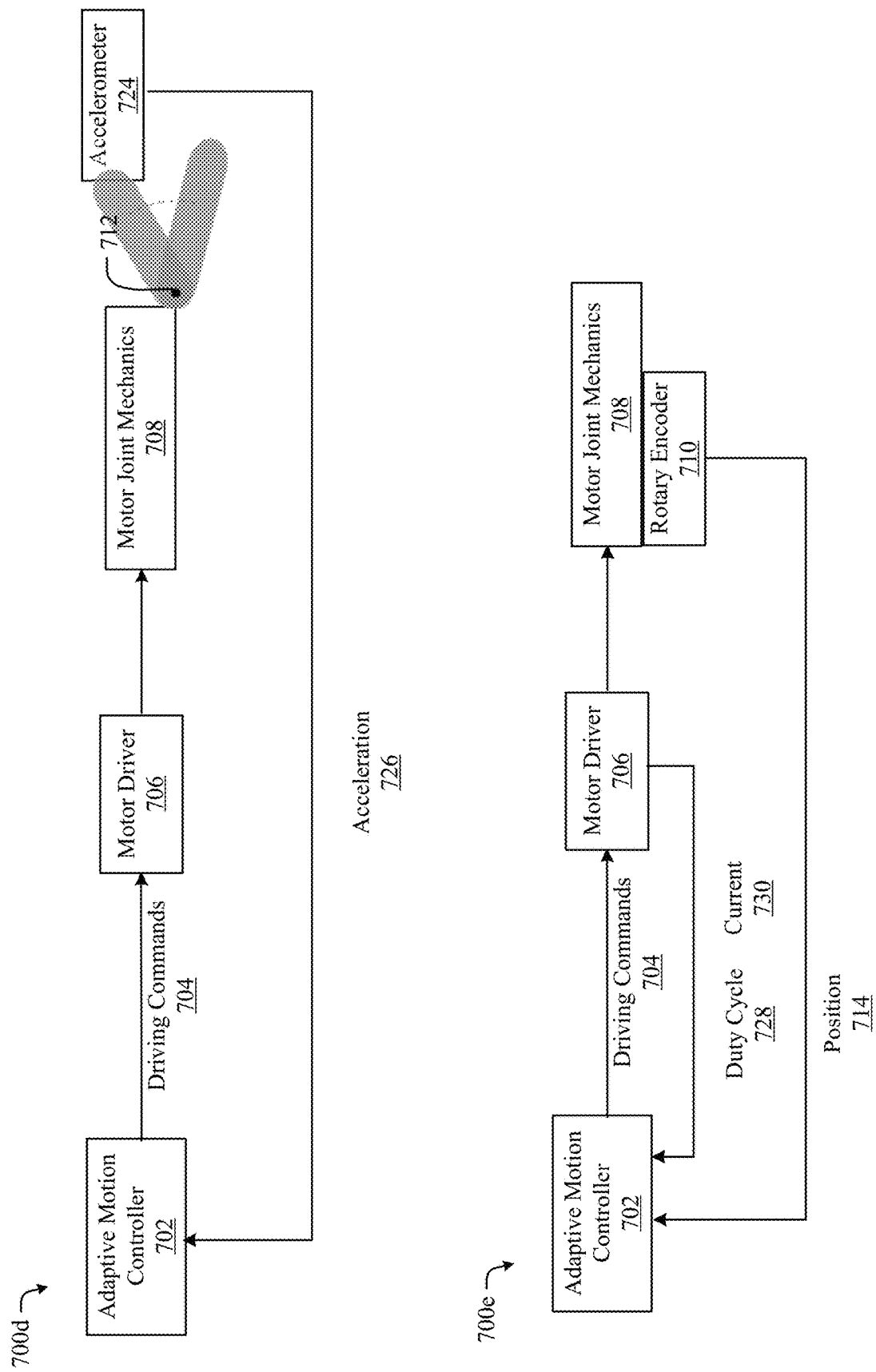

FIG. 6 illustrates another example system 600 of adaptive robotic motion control. In particular embodiments, the system 600 may include robotic planning software 602, a robotic motion controller 606, actuators 610, and a position detection module 612. The process that the example system 600 performs may be similar to the system 500 shown in FIG. 5, where an iterative process is performed to reduce an error between a desired state and an actual state. In particular embodiments, the robotic planning software 602 may generate a desired trajectory 604 as described herein. The robotic planning software 602 may be used to plan the desired trajectory 604 based on the task that the system 600 needs to perform as described herein. The desired trajectory 604 may include one or more desired poses at one or more specified times as disclosed herein. The robotic planning software 602 may send the desired trajectory 604 to the robotic motion controller 606. In particular embodiments, the robotic motion controller 606 may translate the desired trajectory 604 into driving commands 608 for actuators 610. The robotic motion controller 606 may send the driving commands 608 to the actuators 610 to move the actuators 610 to a desired position. A position detection module 612 may be coupled to the actuators 610. In particular embodiments, the position detection module 612 may be embodied as a device that may determine an actual position of the actuators 610. As an example and not by way of limitation, the position detection module 612 may be a rotary encoder that determines an actual pose of the actuator 610. The position detection module 612 may monitor the position of the actuators 610 and continually generate feedback 614 indicative of the actual position of the actuators 610. The position detection module 612 may send feedback 614 back to the robotic motion controller 606. In particular embodiments, the robotic motion controller 606 may determine an actuator 610 is lagging. The robotic motion controller 606 may then update the driving commands 608 to reduce an error between a desired state and actual state determined from the feedback 614. As an example and not by way of limitation, if the driving commands 608 comprised a commanded speed for the actuators 610, the robotic motion controller 606 may update the commanded speed for the actuators 610 to reduce the error between the desired state and the actual state. In some embodiments, the update to the commanded speed may be reducing the commanded speed. In particular embodiments, the robotic motion controller 606 may update the desired trajectory 604 to maintain the desired sequence of poses, but not necessarily the specified times associated with each pose. The update to the desired trajectory 604 allows for actuators 610 more time to perform the desired trajectory 604. Whereas, an actuator 610 may previously be lagging, the updated driving commands 608 may reduce the desired/commanded speed of each actuator 610 to reduce the error between a desired pose and the actual pose. While the position detection module 612 is shown coupled to the actuators 610, the position detection module 612 may be positioned in any other position in the system 600. As an example and not by way of limitation, the position detection module 612 may be coupled to the robotic motion controller 606. In addition, the position detection module 612 may more generally determine a state of the actuators 610 as described herein. As shown in FIGS. 7A-7B, the components of system 600 may be rearranged and include other components to perform the process of adaptive robotic motion control.

FIGS. 7A-7B illustrate example systems 700 of adaptive robotic motion control. Each system 700a, 700b, 700c, 700d, and 700e may be different systems of adaptive robotic motion control. Each of the systems 700a, 700b, 700c, 700d, and 700e may use different mechanisms/devices to monitor a state of the actuators of the system. The monitored state may then be fed back to an adaptive motion controller 702 that sends driving commands 704 to a motor driver 706. In particular embodiments, actuators may be used to cause movement in robotic joints. The powering of the actuators may include one or more of electrical means, hydraulic means, and pneumatic means. The types of robotic joints may include one or more of collinear, rotational, twisting, revolving, or orthogonal. Each robot system 700 may include any different combinations of actuators and joints.

In particular embodiments, the system 700a may include an adaptive motion controller 702, motor driver 706, motor joint mechanics 708, and a rotary encoder 710 coupled to an actuator 712. In particular embodiments, the adaptive motion controller 702 may determine driving commands 704 to send to a motor driver 706 to achieve a desired trajectory as described herein. The adaptive motion controller 702 may send the driving commands 704 to the motor driver 706. The motor driver 706 may use the driving commands to drive the motor joint mechanics 708. The motor joint mechanics 708 may be coupled to an actuator 712, which is monitored by a rotary encoder 710. While only one actuator 712 is shown, the system 700a may include any number of actuators 712. In particular embodiments, the motor joint mechanics 708 may also include actuators. The rotary encoder 710 may send position data 714 to the adaptive motion controller 702. The adaptive motion controller 702 may calculate an error between the received position data 714 and the desired state of the motor joint mechanics 708 and the actuator 712. If there is an error detected, the adaptive motion controller 702 may update the driving commands 704 as described herein. In particular embodiments, the rotary encoder may send velocity data in addition or as a replacement to the position data 714.

In particular embodiments, the system 700b may include an adaptive motion controller 702, motor driver 706, motor joint mechanics 708, and a position tracking module 716 coupled to the motor driver 706. In particular embodiments, the adaptive motion controller 702 may determine driving commands 704 to send to a motor driver 706 to achieve a desired trajectory as described herein. The adaptive motion controller 702 may send the driving commands 704 to the motor driver 706. The motor driver 706 may use the driving commands to drive the motor joint mechanics 708. In particular embodiments, the motor joint mechanics 708 may include actuators. In particular embodiments, the position tracking module 716 may determine a position based on the motor driver 706. The position tracking module 716 may generate position data 714 of the motor joint mechanics 708 derived from the motor driver 706. The position tracking module 716 may send the position data 714 to the adaptive motion controller 702. The adaptive motion controller 702 may calculate an error between the received position data 714 and the desired state of the motor joint mechanics 708. If there is an error detected, the adaptive motion controller 702 may update the driving commands 704 as described herein. In particular embodiments, the position tracking module 716 may send velocity data in addition or as a replacement to the position data 714.

In particular embodiments, the system 700c may include an adaptive motion controller 702, motor driver 706, motor joint mechanics 708 coupled to an actuator 712, cameras 718a, 718b, and a scene analysis module 720. In particular embodiments, the adaptive motion controller 702 may determine driving commands 704 to send to a motor driver 706 to achieve a desired trajectory as described herein. The adaptive motion controller 702 may send the driving commands 704 to the motor driver 706. The motor driver 706 may use the driving commands to drive the motor joint mechanics 708. While only one actuator 712 is shown, the system 700c may include any number of actuators 712. In particular embodiments, the motor joint mechanics 708 may also include actuators. In particular embodiments, the cameras 718a, 718b may monitor the actuator 712 in real-time to generate data to send to the scene analysis module 720. The scene analysis module 720 may generate position data 714 and velocity data 722 based on the data received from the cameras 718a, 718b. The scene analysis module 720 may send the position data 714 and the velocity data 722 to the adaptive motion controller 702. The adaptive motion controller 702 may calculate an error between the received position data 714 and the desired state of the motor joint mechanics 708. The adaptive motion controller 702 may calculate an error between the received velocity data 722 and the desired state of the motor joint mechanics 708. If there is an error detected, the adaptive motion controller 702 may update the driving commands 704 as described herein.

In particular embodiments, the system 700d may include an adaptive motion controller 702, motor driver 706, motor joint mechanics 708 coupled to an actuator 712, and an accelerometer 724 coupled to a robotic limb connected to the joint associated with the actuator 712. In particular embodiments, the adaptive motion controller 702 may determine driving commands 704 to send to a motor driver 706 to achieve a desired trajectory as described herein. The adaptive motion controller 702 may send the driving commands 704 to the motor driver 706. The motor driver 706 may use the driving commands to drive the motor joint mechanics 708. While only one actuator 712 is shown, the system 700d may include any number of actuators 712. In particular embodiments, the motor joint mechanics 708 may also include actuators. In particular embodiments, the accelerometer 724 may monitor the actuator 712 by measuring the data corresponding to the robotic limb during operation. The accelerometer 724 may generate acceleration data 726 based on monitoring the robotic limb connected to the joint associated with the actuator 712. In particular embodiments, the accelerometer 724 may send the acceleration data 726 to the adaptive motion controller 702. The adaptive motion controller 702 may calculate an error between the received acceleration data 726 and the desired state of the motor joint mechanics 708. If there is an error detected, the adaptive motion controller 702 may update the driving commands 704 as described herein.

In particular embodiments, the system 700e may include an adaptive motion controller 702, motor driver 706, motor joint mechanics 708 coupled to a rotary encoder 710. In particular embodiments, the adaptive motion controller 702 may determine driving commands 704 to send to a motor driver 706 to achieve a desired trajectory as described herein. The adaptive motion controller 702 may send the driving commands 704 to the motor driver 706. The motor driver 706 may use the driving commands to drive the motor joint mechanics 708. In particular embodiments, the motor joint mechanics 708 may also include actuators. In particular embodiments, the rotary encoder 710 may monitor the motor joint mechanics 708 and generate position data 714. The rotary encoder 710 may send position data 714 to the adaptive motion controller 702. The adaptive motion controller 702 may calculate an error between the received position data 714 and the desired state of the motor joint mechanics 708 and the actuator 712. If there is an error detected, the adaptive motion controller 702 may update the driving commands 704 as described herein. In particular embodiments, the motor driver 706 may send duty cycle data 728 and current data 730 to the adaptive motion controller 702. In particular embodiments, the adaptive motion controller 702 may use the duty cycle data 728 and/or the current data 730 to inform the update to the driving commands.

Figure 8:
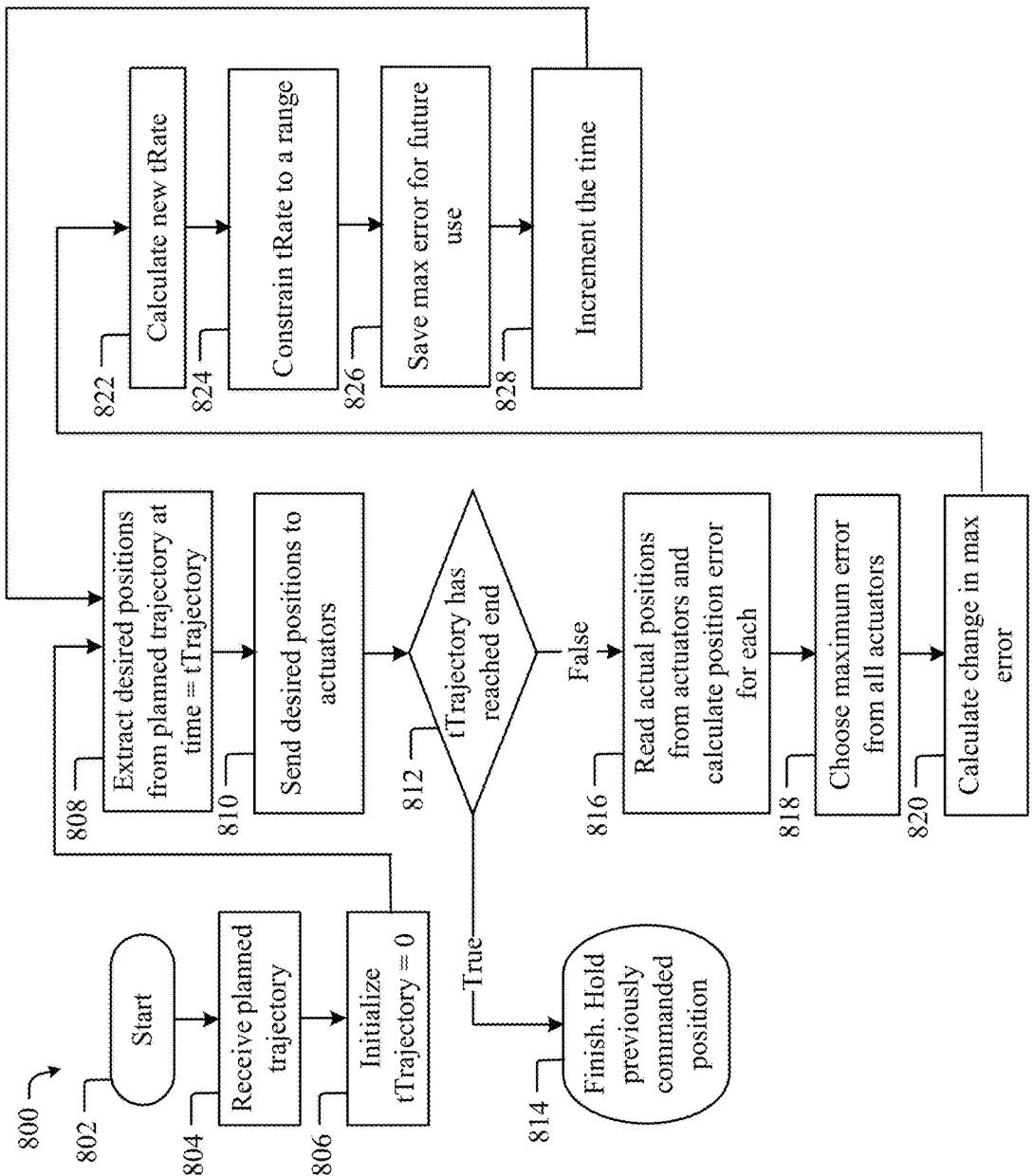
FIG. 8 illustrates an example flow diagram of adaptive robotic motion control.

FIG. 8 illustrates an example flow diagram of a process 800 of adaptive robotic motion control. In particular embodiments, the process 800 may be performed by a robotic system 100 as described herein. In particular embodiments, the robotic system 100 may use an adaptive motion controller to perform the process 800. In particular embodiments, the robotic system 100 may use a proportional derivative (PD) controller that adjusts an execution speed of the planned trajectory. In particular embodiments, the process 800 may start at step 802 and continue to step 804 where a robotic system may receive a planned trajectory. In step 806, the robotic system may initialize tTrajectory=0. In particular embodiments, tTrajectory may refer to the time within the trajectory that is currently being executed. In step 808, the robotic system may extract desired positions from the planned trajectory at time=tTrajectory. In step 810, the robotic system may send the desired positions to actuators. As an example and not by way of limitation, the robotic system may send the desired positions to a robotic motion controller to send driving commands to the actuators based on the desired positions. In step 812, the robotic system determines whether tTrajectory has reached the end of the planned trajectory. If tTrajectory has reached the end of the planned trajectory, the process 800 proceeds to step 814, where the tTrajectory is finished and holds the previously commanded position, such that the robotic system 100 maintains a static position. If tTrajectory has not reached the end of the planned trajectory, the process 800 proceeds to step 816, where the robotic system may read the actual positions from actuators and calculate a position error for each actuator. As an example and not by way of limitation, the robotic system may use a rotary encoder coupled to an actuator to generate actual position data to calculate a position error, err[ ], between the actual position of the actuator and the desired position of the actuator. The robotic system may perform this calculation for each actuator. In step 818, the robotic system may choose a maximum error, errMax=max(err[ ]), from the errors calculated for all actuators. In step 820, the robotic system may calculate a change in max error using the calculation, $$\delta errMax = \frac{(errMax - prevErrMax)}{tStep}.$$

In particular embodiments, tStep may be the amount of time since the previous control loop. In particular embodiments, tStep may be a constant value. As an example and not by way of limitation, tStep may be 1 ms. In step 822, the robotic system may calculate a new tRate using the calculation, tRate+=$k_p$*errMax+$k_d$*δerrMax. In particular embodiments, tRate indicates the rate at which tTrajectory increases, where when tRate=1, the trajectory will execute at the planned speed. In particular embodiments, $k_p$ is the proportional constant for the PD controller. In particular embodiments, $k_d$ is the derivative constant for the PD controller. In step 824, the robotic system may constrain tRate to a range, [0.1, 1], where tRate=min (1, max(0.1, tRate)). In step 826, the robotic system may save the max error for future use, using the formula, prevErrMax=errMax. In step 828, the robotic system may increment the time using the calculation, tTrajectory+=tRate*(tStep). After step 828, the process 800 may return to step 808 to extract desired positions from the planned trajectory. The process 800 may continue through multiple loops until tTrajectory has reached the end in step 814.

Figure 9:
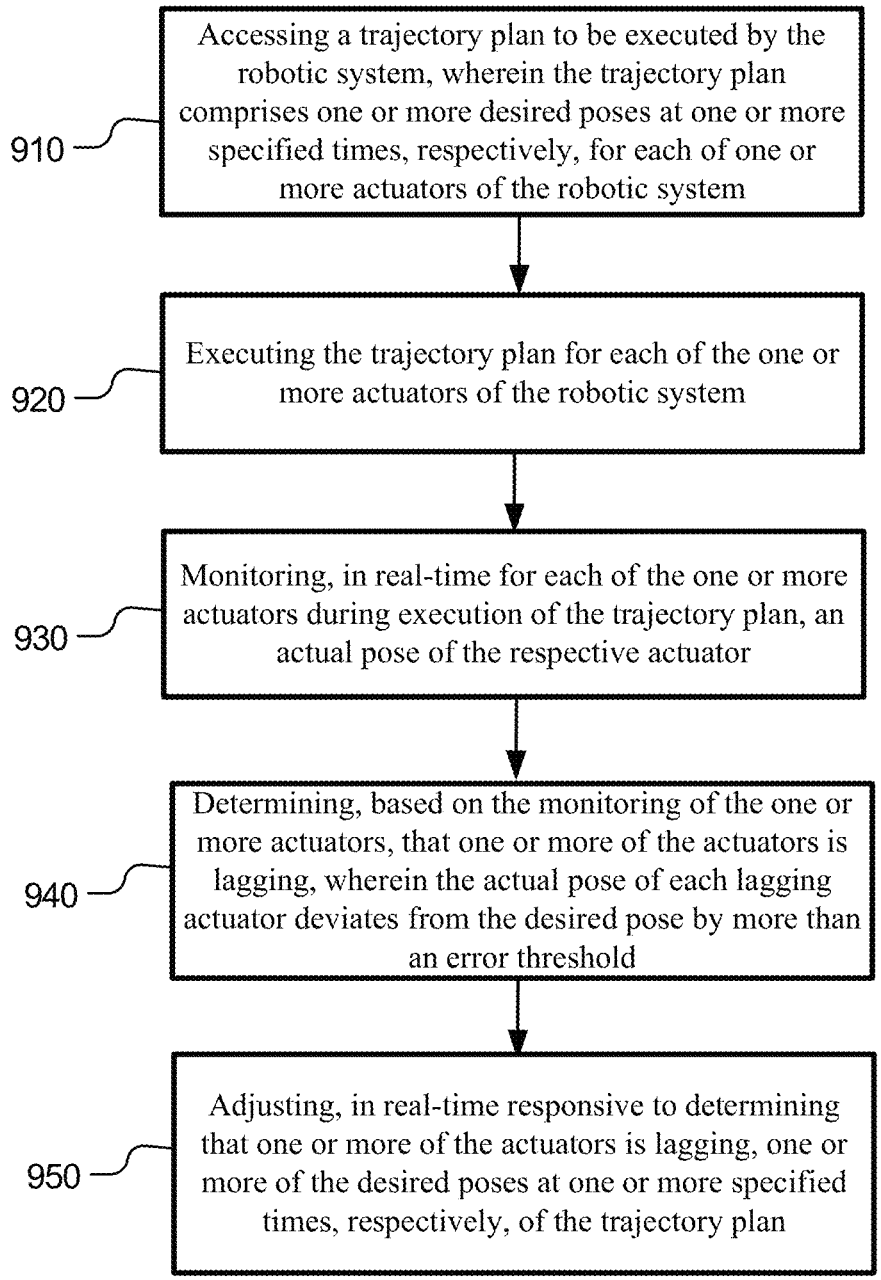
FIG. 9 illustrates an example method for adaptive robotic motion control.

FIG. 9 illustrates is a flow diagram of a method for adaptive robotic motion control, in accordance with the presently disclosed embodiments. The method 900 may be performed utilizing one or more processing devices (e.g., robotic system 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing 2D and 3D image data, software (e.g., instructions running/executing on one or more processors), firmware (e.g., microcode), or some combination thereof.

The method 900 may begin at step 910 with the one or more processing devices (e.g., robotic system 100) accessing a trajectory plan to be executed by the robotic system. In particular embodiments, the trajectory plan may comprise one or more desired poses at one or more specified times, respectively, for each of one or more actuators of the robotic system. The method 900 may then continue at step 920 with the one or more processing devices (e.g., robotic system 100) executing the trajectory plan for each of the one or more actuators of the robotic system. The method 900 may then continue at step 930 with the one or more processing devices (e.g., robotic system 100) monitoring, in real-time for each of the one or more actuators during execution of the trajectory plan, an actual pose of the respective actuator. The method 900 may then continue at block 940 with the one or more processing devices (e.g., robotic system 100) determining, based on the monitoring of the one or more actuators, that one or more of the actuators is lagging. In particular embodiments, the actual pose of each lagging actuator may deviate from the desired pose by more than an error threshold. The method 900 may then continue at step 950 with the one or more processing devices (e.g., robotic system 100) adjusting, in real-time responsive to determining that one or more of the actuators is lagging, one or more of the desired poses at one or more specified times, respectively, of the trajectory plan. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for adaptive robotic motion control including the particular steps of the method of FIG. 9, this disclosure contemplates any suitable method for adaptive robotic motion control including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Systems and Methods

Figure 10:
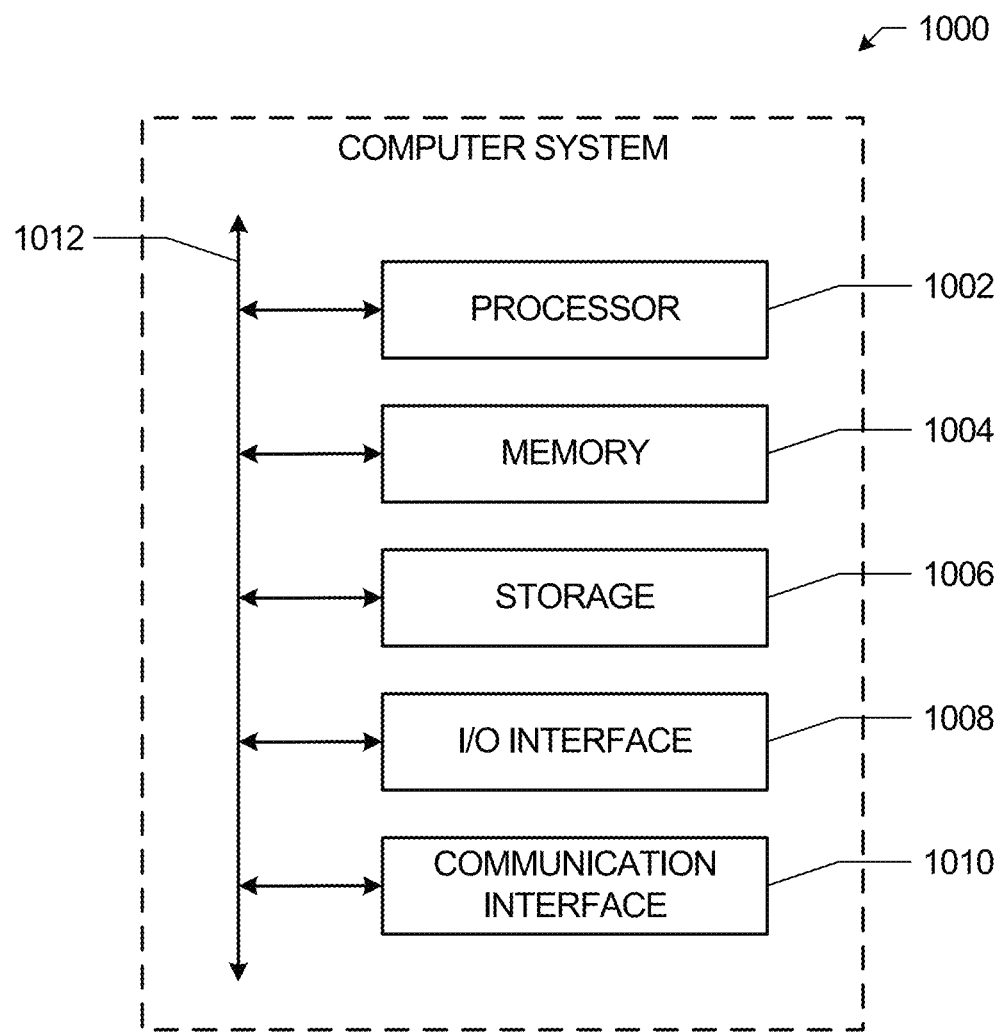
FIG. 10 illustrates an example computer system.

FIG. 10 illustrates an example computer system 1000 that may be utilized to perform adaptive motion control, in accordance with the presently disclosed embodiments. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks.

Where appropriate, one or more computer systems 1000 may perform without substantial spatial or temporal limitation one or more steps of one or more methods described or illustrated herein. As an example, and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement. In particular embodiments, processor 1002 includes hardware for executing instructions, such as those making up a computer program. As an example, and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example, and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002.

Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example, and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere).

One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memory devices 1004, where appropriate. Although this disclosure describes and illustrates particular memory, this disclosure contemplates any suitable memory.

In particular embodiments, storage 1006 includes mass storage for data or instructions. As an example, and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1006 for them. Where appropriate, I/O interface 1008 may include one or more device or software drivers enabling processor 1002 to drive one or more of these I/O devices. I/O interface 1008 may include one or more I/O interfaces 1006, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it.

As an example, and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example, and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

AI Architecture

Figure 11:
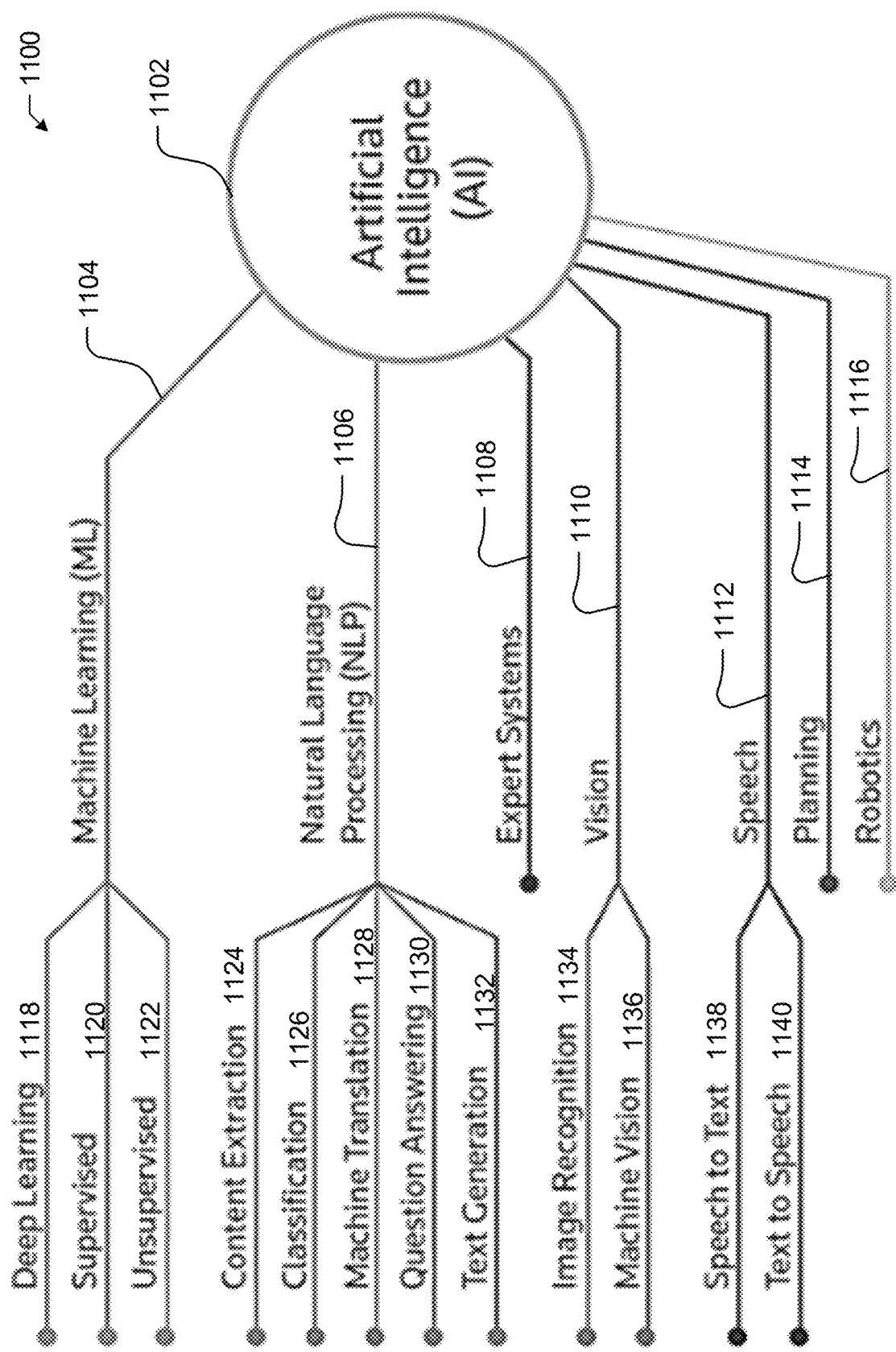
FIG. 11 illustrates a diagram of an example artificial intelligence (AI) architecture.

FIG. 11 illustrates a diagram 1100 of an example artificial intelligence (AI) architecture 1102 that may be utilized to perform adaptive motion control, in accordance with the presently disclosed embodiments. In particular embodiments, the AI architecture 1102 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 11, the AI architecture 1102 may include machine leaning (ML) algorithms and functions 1104, natural language processing (NLP) algorithms and functions 1106, expert systems 1108, computer-based vision algorithms and functions 1110, speech recognition algorithms and functions 1112, planning algorithms and functions 1114, and robotics algorithms and functions 1116. In particular embodiments, the ML algorithms and functions 1104 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 1104 may include deep learning algorithms 1118, supervised learning algorithms 1120, and unsupervised learning algorithms 1122.

In particular embodiments, the deep learning algorithms 1118 may include any artificial neural networks (ANNs) that may be utilized to learn deep levels of representations and abstractions from large amounts of data. For example, the deep learning algorithms 1118 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 1120 may include any algorithms that may be utilized to apply, for example, what has been learned in the past to new data using labeled examples for predicting future events. For example, starting from the analysis of a known training dataset, the supervised learning algorithms 1120 may produce an inferred function to make predictions about the output values. The supervised learning algorithms 1120 can also compare its output with the correct and intended output and find errors in order to modify the supervised learning algorithms 1120 accordingly. On the other hand, the unsupervised learning algorithms 1122 may include any algorithms that may applied, for example, when the data used to train the unsupervised learning algorithms 1122 are neither classified or labeled. For example, the unsupervised learning algorithms 1122 may study and analyze how systems may infer a function to describe a hidden structure from unlabeled data.

In particular embodiments, the NLP algorithms and functions 1106 may include any algorithms or functions that may be suitable for automatically manipulating natural language, such as speech and/or text. For example, in particular embodiments, the NLP algorithms and functions 1106 may include content extraction algorithms or functions 1124, classification algorithms or functions 1126, machine translation algorithms or functions 1128, question answering (QA) algorithms or functions 1130, and text generation algorithms or functions 1132. In particular embodiments, the content extraction algorithms or functions 1124 may include a means for extracting text or images from electronic documents (e.g., webpages, text editor documents, and so forth) to be utilized, for example, in other applications.

In particular embodiments, the classification algorithms or functions 1126 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 1128 may include any algorithms or functions that may be suitable for automatically converting source text in one language, for example, into text in another language. The QA algorithms or functions 1130 may include any algorithms or functions that may be suitable for automatically answering questions posed by humans in, for example, a natural language, such as that performed by voice-controlled personal assistant devices. The text generation algorithms or functions 1132 may include any algorithms or functions that may be suitable for automatically generating natural language texts.

In particular embodiments, the expert systems 1108 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 1110 may include any algorithms or functions that may be suitable for automatically extracting information from images (e.g., photo images, video images). For example, the computer-based vision algorithms and functions 1110 may include image recognition algorithms 1134 and machine vision algorithms 1136. The image recognition algorithms 1134 may include any algorithms that may be suitable for automatically identifying and/or classifying objects, places, people, and so forth that may be included in, for example, one or more image frames or other displayed data. The machine vision algorithms 1136 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 1112 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 1138 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 1140 may include any algorithms, functions, or systems that may enable one or more devices to replicate human behavior through, for example, motions, gestures, performance tasks, decision-making, emotions, and so forth.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a robotic system:
   accessing a trajectory plan to be executed by the robotic system, wherein the trajectory plan comprises a trajectory to a final, goal pose for each of one or more actuators of the robotic system, and the trajectory plan further comprises one or more desired poses at one or more specified times, respectively, for each of one or more actuators of the robotic system;
   executing the trajectory plan for each of the one or more actuators of the robotic system;
   monitoring, in real-time for each of the one or more actuators during execution of the trajectory plan, an actual pose of the respective actuator;
   determining, based on the monitoring of the one or more actuators, that one or more of the actuators is lagging, wherein the actual pose of each lagging actuator deviates from the desired pose by more than an error threshold; and
   adjusting, in real-time responsive to determining that one or more of the actuators is lagging, one or more of the desired poses at one or more specified times, respectively, of the trajectory plan, without altering the final, goal pose that the trajectory plan results in.

2. The method of claim 1, wherein accessing the trajectory plan to be executed by the robotic system comprises:
   accessing, for each of the one or more actuators, one or more capabilities of the respective actuator; and
   planning the one or more desired poses at the one or more specified times, respectively for each of the one or more actuators based on the one or more capabilities of the respective actuators.

3. The method of claim 2, further comprising:
   determining, for each lagging actuator, one or more updated values of the one or more capabilities of the respective actuator; and
   updating, for each lagging actuators, the one or more capabilities of the respective actuator with the one or more updated values.

4. The method of claim 1, further comprising:
   monitoring, in real-time for each of the one or more actuators during execution of the trajectory plan, a velocity of the respective actuator,
   wherein determining that one or more of the actuators is lagging is further based on the monitoring of the velocity of the one or more actuators.

5. The method of claim 1, wherein determining that one or more of the actuators is lagging comprises, for one or more of the actuators:
   comparing the actual pose of the respective actuator at a specific time to a desired pose of the respective actuator at the specific time according to the trajectory plan; and
   determining, based on the comparison, the respective actuator is lagging if the actual pose of the respective actuator at the specific time deviates from the desired pose at the specific time by more than the error threshold.

6. The method of claim 1, further comprising:
   determining a deviation between the actual pose of each lagging actuator and the desired pose has fallen below the error threshold; and
   adjusting the one or more of the desired poses at the one or more specified times, respectively, of the trajectory plan.

7. The method of claim 1, wherein a size of an adjustment of the one or more actuators is based on a size of a deviation between the actual pose of a lagging actuator and the desired pose of the respective actuator.

8. A robotic system comprising:
one or more robotic limbs;
one or more non-transitory computer-readable storage media including instructions; and
one or more processors coupled to the storage media, the one or more processors configured to execute the instructions to:
access a trajectory plan to be executed by the robotic system, wherein the trajectory plan comprises a trajectory to a final, goal pose for each of one or more actuators of the robotic system, and the trajectory plan further comprises one or more desired poses at one or more specified times, respectively, for each of one or more actuators of the robotic system;
execute the trajectory plan for each of the one or more actuators of the robotic system;
monitor, in real-time for each of the one or more actuators during execution of the trajectory plan, an actual pose of the respective actuator;
determine, based on the monitoring of the one or more actuators, that one or more of the actuators is lagging, wherein the actual pose of each lagging actuator deviates from the desired pose by more than an error threshold; and
adjust, in real-time responsive to determining that one or more of the actuators is lagging, one or more of the desired poses at one or more specified times, respectively, of the trajectory plan, without altering the final, goal pose that the trajectory plan results in.

9. The robotic system of claim 8, wherein the processors are further configured to execute the instructions to:
access, for each of the one or more actuators, one or more capabilities of the respective actuator; and
plan the one or more desired poses at the one or more specified times, respectively for each of the one or more actuators based on the one or more capabilities of the respective actuators.

10. The robotic system of claim 9, wherein the processors are further configured to execute the instructions to:
determine, for each lagging actuator, one or more updated values of the one or more capabilities of the respective actuator; and
update, for each lagging actuators, the one or more capabilities of the respective actuator with the one or more updated values.

11. The robotic system of claim 8, wherein the processors are further configured to execute the instructions to:
monitor, in real-time for each of the one or more actuators during execution of the trajectory plan, a velocity of the respective actuator,
wherein determining that one or more of the actuators is lagging is further based on the monitoring of the velocity of the one or more actuators.

12. The robotic system of claim 8, wherein the processors are further configured to execute the instructions to:
compare the actual pose of the respective actuator to a desired pose of the respective actuator at a specific time according to the trajectory plan; and
determine, based on the comparison, the respective actuator is lagging if the actual pose of the respective actuator deviates from the desired pose by more than an error threshold.

13. The robotic system of claim 8, wherein the processors are further configured to execute the instructions to:
determine a deviation between the actual pose of each lagging actuator and the desired pose has fallen below the error threshold; and
adjust the one or more of the desired poses at the one or more specified times, respectively, of the trajectory plan.

14. The robotic system of claim 8, wherein a size of an adjustment of the one or more actuators is based on a size of a deviation between the actual pose of a lagging actuator and the desired pose of the respective actuator.

15. A computer-readable non-transitory storage media comprising instructions executable by one or more processors of a robotic system to:
access a trajectory plan to be executed by the robotic system, wherein the trajectory plan comprises a trajectory to a final, goal pose for each of one or more actuators of the robotic system, and the trajectory plan further comprises one or more desired poses at one or more specified times, respectively, for each of one or more actuators of the robotic system;
execute the trajectory plan for each of the one or more actuators of the robotic system;
monitor, in real-time for each of the one or more actuators during execution of the trajectory plan, an actual pose of the respective actuator;
determine, based on the monitoring of the one or more actuators, that one or more of the actuators is lagging, wherein the actual pose of each lagging actuator deviates from the desired pose by more than an error threshold; and
adjust, in real-time responsive to determining that one or more of the actuators is lagging, one or more of the desired poses at one or more specified times, respectively, of the trajectory plan, without altering the final, goal pose that the trajectory plan results in.

16. The media of claim 15, wherein the instructions are further executable by the processor to:
access, for each of the one or more actuators, one or more capabilities of the respective actuator; and
plan the one or more desired poses at the one or more specified times, respectively for each of the one or more actuators based on the one or more capabilities of the respective actuators.

17. The media of claim 16, wherein the instructions are further executable by the processor to:
determine, for each lagging actuator, one or more updated values of the one or more capabilities of the respective actuator; and
update, for each lagging actuators, the one or more capabilities of the respective actuator with the one or more updated values.

18. The media of claim 15, wherein the instructions are further executable by the processor to:
monitor, in real-time for each of the one or more actuators during execution of the trajectory plan, a velocity of the respective actuator,
wherein determining that one or more of the actuators is lagging is further based on the monitoring of the velocity of the one or more actuators.

19. The media of claim 15, wherein the instructions are further executable by the processor to:
compare the actual pose of the respective actuator to a desired pose of the respective actuator at a specific time according to the trajectory plan; and
determine, based on the comparison, the respective actuator is lagging if the actual pose of the respective actuator deviates from the desired pose by more than an error threshold.

20. The media of claim 15, wherein the instructions are further executable by the processor to:
 determine a deviation between the actual pose of each lagging actuator and the desired pose has fallen below the error threshold; and
 adjust the one or more of the desired poses at the one or more specified times, respectively, of the trajectory plan.

* * * * *